(12) United States Patent
Lander et al.

(10) Patent No.: US 9,446,979 B2
(45) Date of Patent: Sep. 20, 2016

(54) METHOD FOR SPARKLE CONTROL AND ARTICLES THEREOF

(71) Applicant: Corning Incorporated, Corning, NY (US)

(72) Inventors: Charles Warren Lander, Wayland, NY (US); Kelvin Nguyen, Corning, NY (US); Alan Thomas Stephens, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 699 days.

(21) Appl. No.: 13/662,789

(22) Filed: Oct. 29, 2012

(65) Prior Publication Data

US 2013/0107370 A1    May 2, 2013

Related U.S. Application Data

(60) Provisional application No. 61/554,609, filed on Nov. 2, 2011.

(51) Int. Cl.
| | | |
|---|---|---|
| *C03C 3/093* | (2006.01) | |
| *C03C 15/00* | (2006.01) | |
| *G02B 5/02* | (2006.01) | |
| *C03C 3/087* | (2006.01) | |

(52) U.S. Cl.
CPC ............... *C03C 3/093* (2013.01); *C03C 3/087* (2013.01); *C03C 15/00* (2013.01); *G02B 5/0221* (2013.01); *G02B 5/0268* (2013.01); *G02B 5/0278* (2013.01); *C03C 2218/34* (2013.01)

(58) Field of Classification Search
None
See application file for complete search history.

(56) References Cited

U.S. PATENT DOCUMENTS

| | | | |
|---|---|---|---|
| 3,616,098 A * | 10/1971 | Falls | 428/141 |
| 4,921,626 A | 5/1990 | Rhodenbaugh | |
| 5,415,731 A * | 5/1995 | Kim | 216/97 |
| 5,989,450 A | 11/1999 | Kim | |
| 6,807,824 B1 | 10/2004 | Miwa | |
| 7,276,181 B2 | 10/2007 | Miwa | |

(Continued)

FOREIGN PATENT DOCUMENTS

| | | | | |
|---|---|---|---|---|
| WO | WO 2011/137141 | 11/2011 | ............. | C03C 3/087 |
| WO | WO 2012/074811 | 6/2012 | ............. | C30C 15/00 |
| WO | WO 2012/118594 | 9/2012 | ............. | C03C 15/00 |

OTHER PUBLICATIONS

Invitation to Pay Additional Fees and Annex to Form PCT/ISA/206 Communication Relating to the Results of the Partial International Search—International Application No. PCT/US2012/062545—International Filing Date Oct. 30, 2012.

*Primary Examiner* — Duy Deo
(74) *Attorney, Agent, or Firm* — John L. Haack

(57) ABSTRACT

A glass article including: at least one anti-glare surface having haze, distinctness-of-image, surface roughness, uniformity properties and sparkle properties, as defined herein. A method of making the glass article includes, for example, slot coating a suspension of particles on at least one surface of the article to provide a particulated mask covering from about 40 to 92% of the coated surface area; contacting the at least one surface of the article having the particulated mask and an etchant to form the anti-glare surface, and optionally continuously polishing the suspension of particles just prior to slot coating. A display system that incorporates the glass article, as defined herein, is also disclosed.

12 Claims, 16 Drawing Sheets

(56) References Cited

U.S. PATENT DOCUMENTS

| | | |
|---|---|---|
| 2006/0046078 A1* | 3/2006 | Richter et al. ............... 428/447 |
| 2010/0246016 A1 | 9/2010 | Carlson et al. |
| 2011/0062849 A1 | 3/2011 | Carlson et al. |
| 2011/0267697 A1 | 11/2011 | Kohli et al. |
| 2011/0267698 A1* | 11/2011 | Guilfoyle et al. ............ 359/609 |
| 2012/0134024 A1 | 5/2012 | Lander et al. |

* cited by examiner

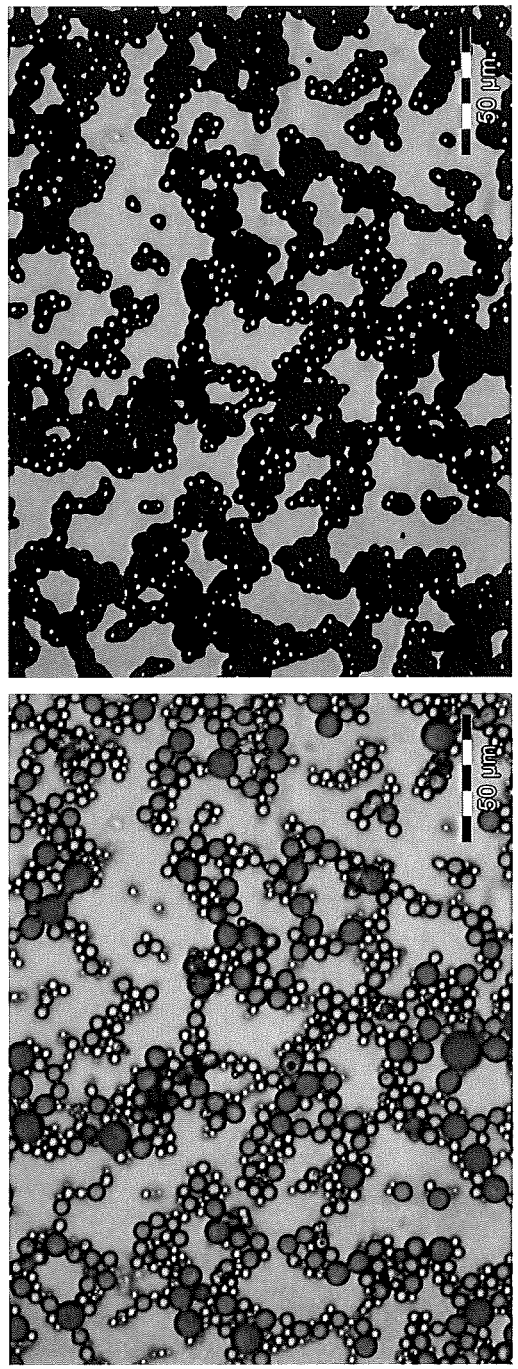

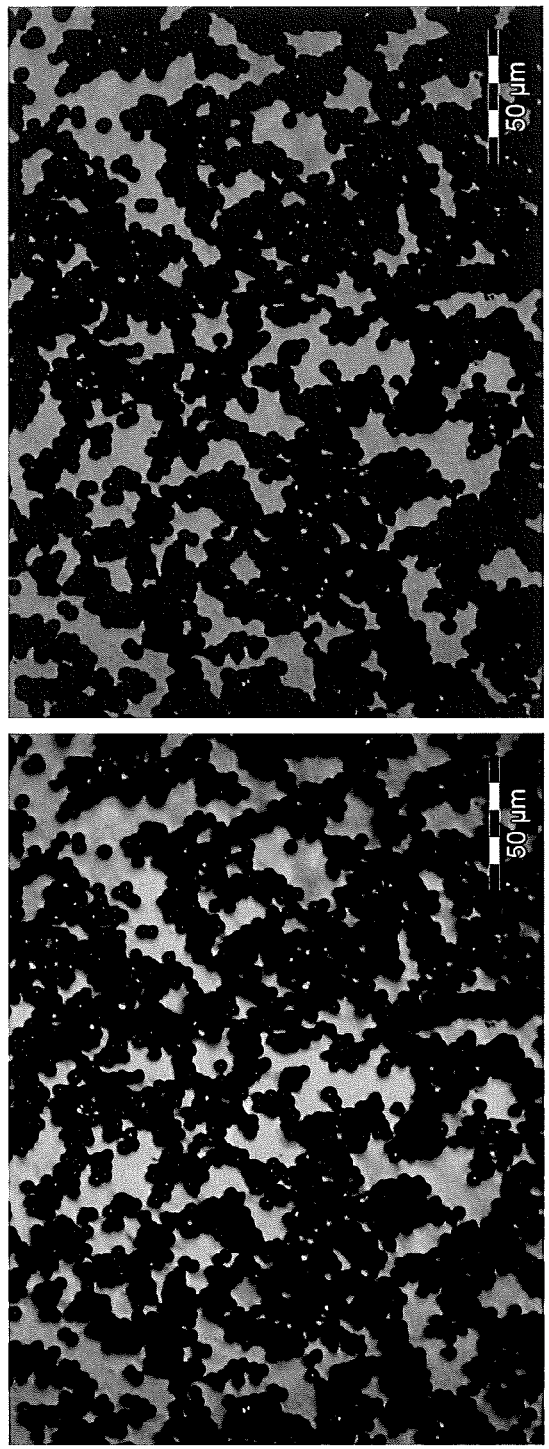

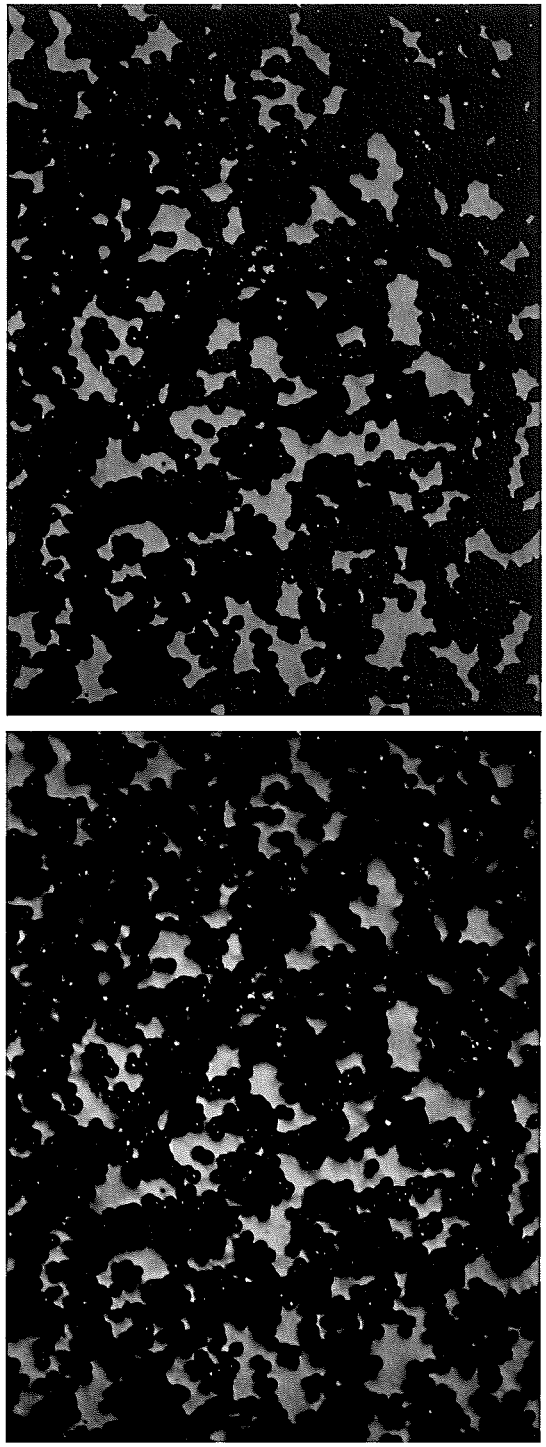

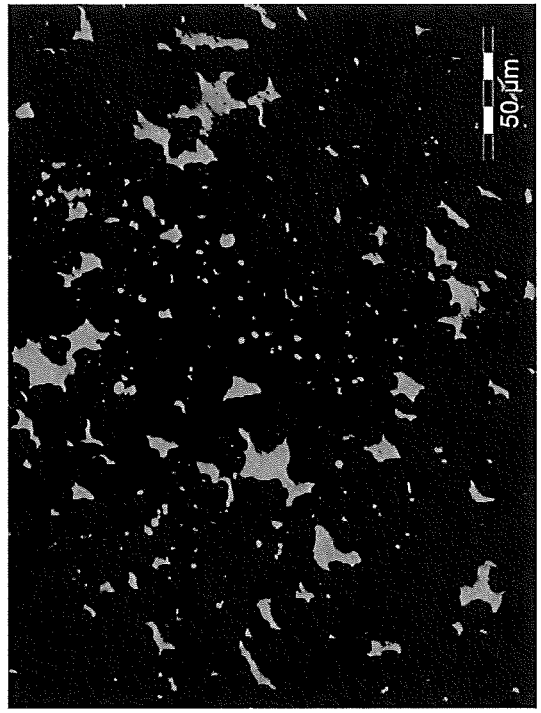
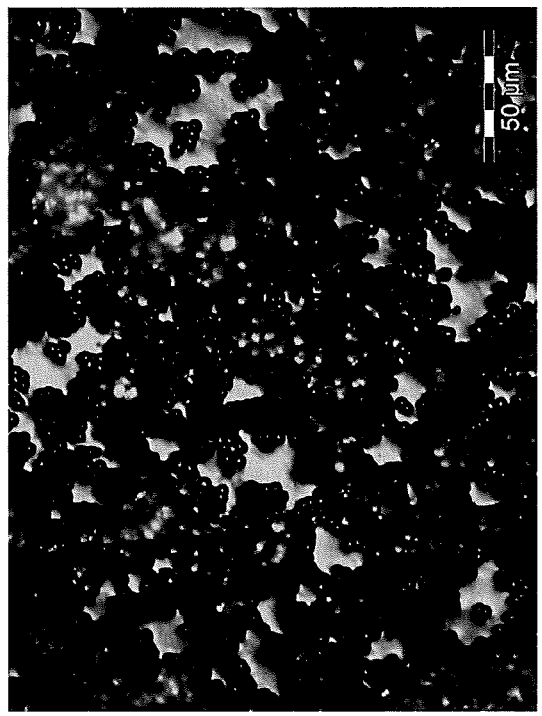
Fig. 7a
Fig. 7b

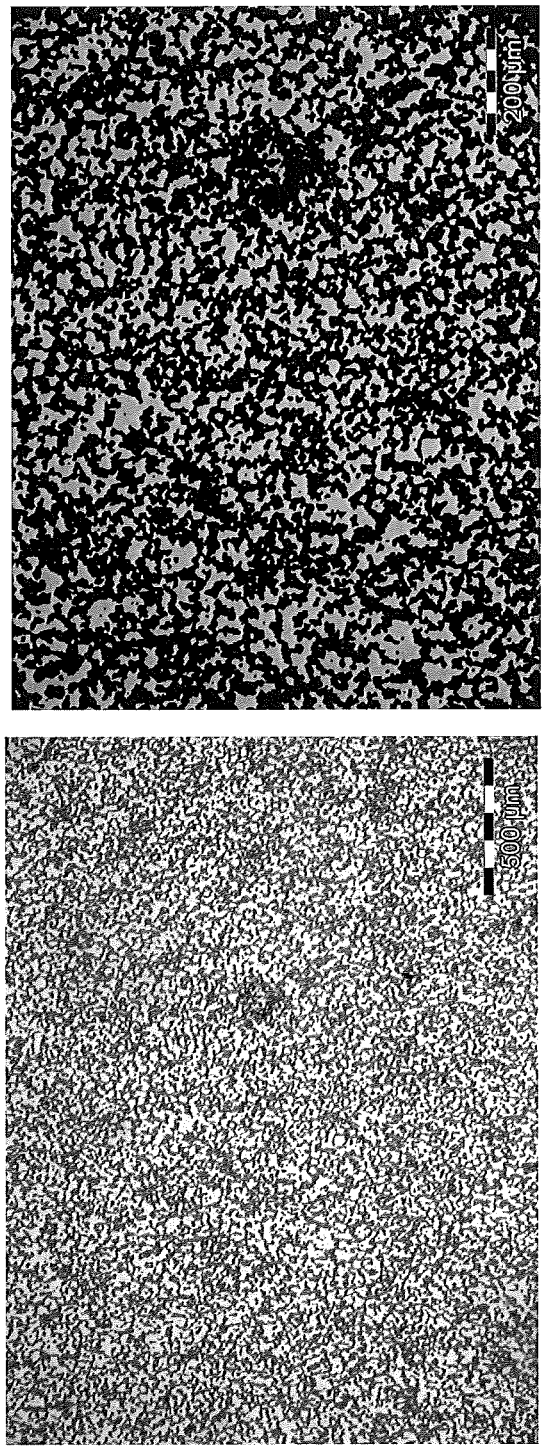

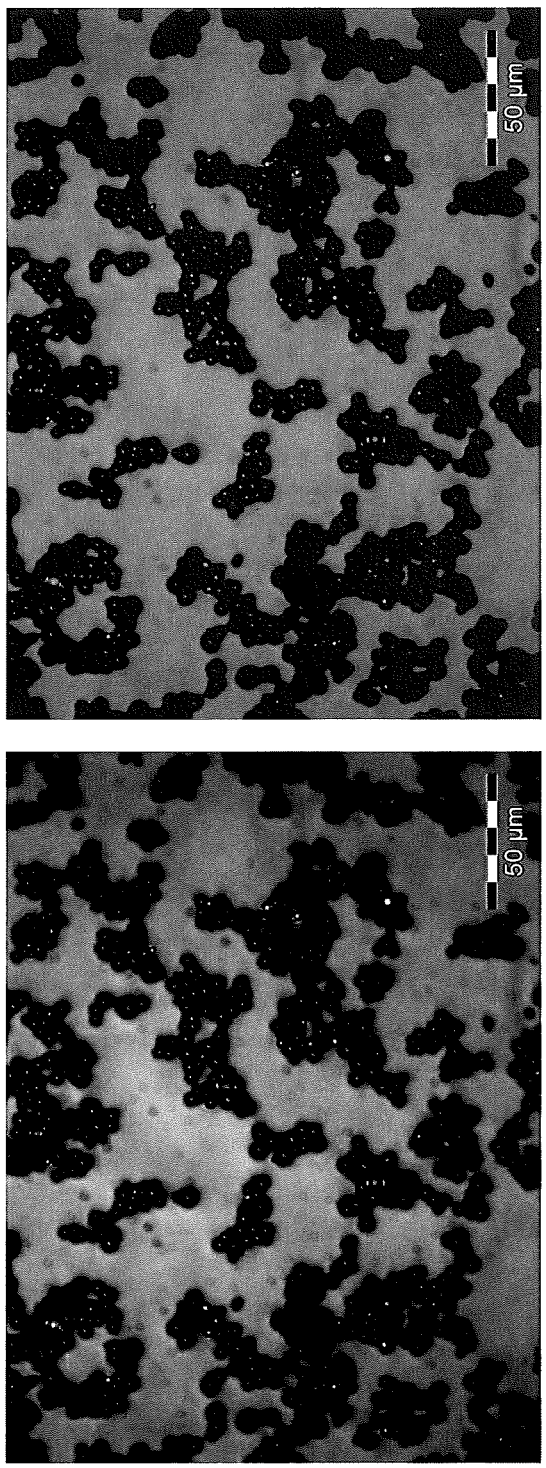

METHOD FOR SPARKLE CONTROL AND ARTICLES THEREOF

CROSS-REFERENCE TO RELATED APPLICATIONS

This application claims the benefit of priority under 35 U.S.C. §119 of U.S. Provisional Application Ser. No. 61/554,609, filed Nov. 2, 2011, the content of which is relied upon and incorporated herein by reference in its entirety.

BACKGROUND

The disclosure relates generally to methods of and apparatus for making and using an anti-glare surface and articles thereof having controlled sparkle properties.

SUMMARY

The disclosure provides a method of and apparatus for making an anti-glare surface having controlled sparkle properties, articles made by the method, and a display system incorporating the article having the anti-glare surface having reduced or controlled sparkle properties. The method of making includes controllably depositing a suspension of sacrificial particles on at least one surface of an article in limited amounts, such as from about 40 to 92% surface coverage of the total area contacted, that is less than a monolayer of closely packed particles, and contacting the particle treated surface (particulated surface) with an etchant to form the anti-glare surface.

BRIEF DESCRIPTION OF THE DRAWING(S)

In embodiments of the disclosure:

FIG. 1 schematically shows the steps in the process of creating an anti-glare layer on, for example, a GORILLA® glass surface.

FIG. 2 shows a micrograph of a Gorilla® glass coated (particulated) sample that is ready for etching.

FIGS. 3a and 3b show, respectively, before analysis (3a) and after (3b) applying the image analysis to determine the percent coverage for 3 micrometer particle deposition for an exemplary slot coated sample at 100× magnification at 100% and 60% coverage.

FIGS. 4a and 4b show, respectively, the exact same image location captured in FIGS. 3a and 3b but at 500× magnification.

FIGS. 5a and 5b show another slot sample having a different area coverage of 74% at 500× magnification.

FIGS. 6a and 6b show another slot coated sample having a different area coverage of 83% at 500× magnification.

FIGS. 7a and 7b show another slot coated sample having a particle surface area coverage of 92% at 500× magnification.

FIGS. 8a and 8b show still another slot coated sample of a mixed particle formulation having a mixed particle surface area coverage of 61% at 100× magnification.

FIGS. 9a and 9b show another slot coated sample having a coated particle surface area coverage of 43% at 500× magnification.

DETAILED DESCRIPTION

Figure 1:
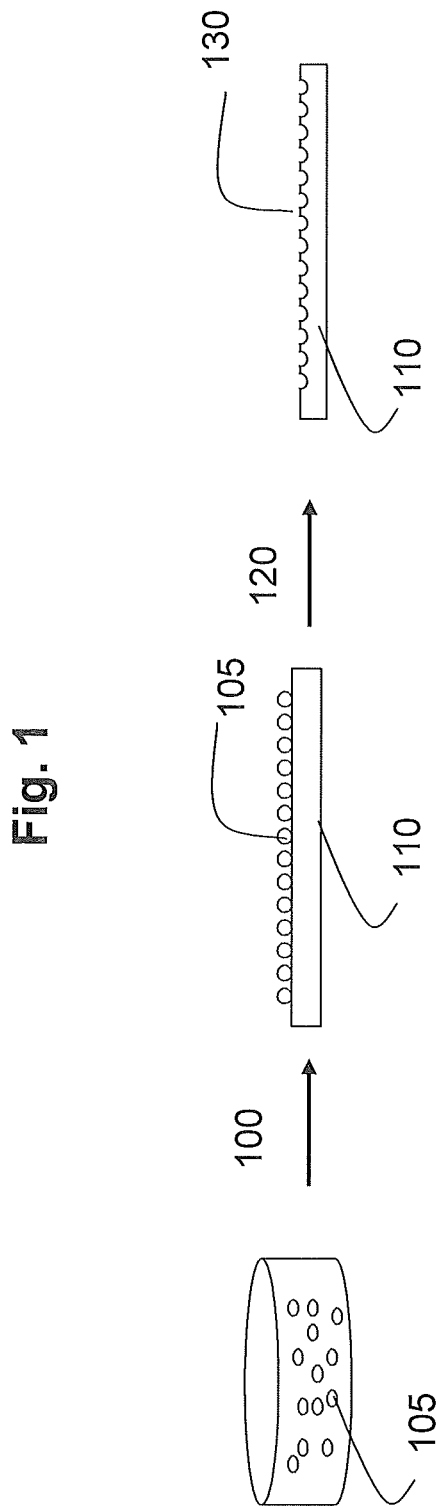

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Anti-glare" or like terms refer to a physical transformation of light contacting the treated surface of an article, such as a display, of the disclosure that changes, or to the property of changing light reflected from the surface of an article, into a diffuse reflection rather than a specular reflection. In embodiments, the surface treatment can be produced by mechanical or chemical etching. Anti-glare does not reduce the amount of light reflected from the surface, but only changes the characteristics of the reflected light. An image reflected by an anti-glare surface has no sharp boundaries. In contrast to an anti-glare surface, an anti-reflective surface is typically a thin-film coating that reduces the reflection of light from a surface via the use of refractive-index variation and, in some instances, destructive interference techniques.

"Contacting" or like terms refer to a close physical touching that can result in a physical change, a chemical change, or both, to at least one touched entity. In the present disclosure various particulate deposition or contacting techniques, such as slot coating, spray coating, dip coating, and like techniques, can provide a particulated surface when contacted as illustrated and demonstrated herein. Additionally or alternatively, various chemical treatments of the particulated surface, such as spray, immersion, and like techniques, or combinations thereof, as illustrated and demonstrated herein, can provide an etched surface when contacted with one or more etchant compositions.

"Distinctness-of-reflected image," "distinctness-of-image," "DOI" or like term is defined by method A of ASTM procedure D5767 (ASTM 5767), entitled "Standard Test Methods for Instrumental Measurements of Distinctness-of-Image Gloss of Coating Surfaces." In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to equation (1):

$$DOI = \left[1 - \frac{R_{os}}{R_s}\right] \times 100 \qquad (1)$$

where Rs is the relative amplitude of reflectance in the specular direction and Ros is the relative amplitude of reflectance in an off-specular direction. As described herein, Ros, unless otherwise specified, is calculated by averaging the reflectance over an angular range from 0.2° to 0.4° away from the specular direction. Rs can be calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767. The Novo-gloss instrument uses a detector array in which the specular angle is centered about the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The Ros/Rs ratio can be calculated from the average values obtained for Rs and Ros as described above. "20° DOI," or "DOI 20°" refers to DOI measurements in which the light is incident on the sample at 20° off the normal to the glass surface, as described in ASTM D5767. The measurement of either DOI or common gloss using the 2-side method can best be performed in a dark room or enclosure so that the measured value of these properties is zero when the sample is absent.

For anti-glare surfaces, it is generally desirable that DOI be relatively low and the reflectance ratio (Ros/Rs) of eq. (1) be relatively high. This results in visual perception of a blurred or indistinct reflected image. In embodiments, the at least one roughened surface of the glass article has a Ros/Rs greater than about 0.1, greater than about 0.4, and, greater than about 0.8, when measured at an angle of 20° from the specular direction using the 1-side method measurement. Using the 2-side method, the Ros/Rs of the glass article at a 20° angle from the specular direction is greater than about 0.05. In embodiments, the Ros/Rs measured by the 2-side method for the glass article is greater than about 0.2, and greater than about 0.4. Common gloss, as measured by ASTM D523, is insufficient to distinguish surfaces with a strong specular reflection component (distinct reflected image) from those with a weak specular component (blurred reflected image). This can be attributable to the small-angle scattering effects that are not measureable using common gloss meters designed according to ASTM D523.

"Transmission haze," "haze," or like terms refer to a particular surface light scatter characteristic related to surface roughness. Haze measurement is specified in greater detail below.

"Roughness," "surface roughness (Ra)," or like terms refer to, on a microscopic level or below, an uneven or irregular surface condition, such as an average root mean squared (RMS) roughness or RMS roughness described below.

"Gloss," "gloss level," or like terms refer to, for example, surface luster, brightness, or shine, and more particularly to the measurement of specular reflectance calibrated to a standard (such as, for example, a certified black glass standard) in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values. The anti-glare surface of the glass article has a gloss (i.e.; the amount of light that is specularly reflected from sample relative to a standard at a specific angle) of up to 90 SGU (standard gloss units), as measured according to ASTM standard D523, and, in one embodiment, has a gloss in a range from about 60 SGU up to about 80 SGU. See also the DOI definition above.

"ALF" or "average characteristic largest feature size" or like terms refer to a measure of surface feature variation in the x- and y-directions, i.e., in the plane of the substrate, as discussed further below.

"Sparkle," "display sparkle," or like terms refer to the relationship between the size of features on the at least one roughened glass surface and pixel pitch, particularly the smallest pixel pitch, is of interest. Display "sparkle" is commonly evaluated by human visual inspection of a material that is placed adjacent to a pixelated display. ALF and its relationship to display "sparkle" has been found to be a valid metric for different materials having different surface morphologies, including glasses of varying composition and particle-coated polymer materials. A strong correlation between average largest characteristic feature size (ALF) and visual ranking of display sparkle severity exists across multiple different sample materials and surface morphologies. In embodiments, the glass article can be a glass panel that forms a portion of a display system. The display system can include a pixelated image display panel that is disposed adjacent to the glass panel. The smallest pixel pitch of the display panel can be greater than ALF.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments can refer to, for example:

a method of making a glass article by depositing sacrificial particles on a surface of the article, such as by slot coating a suspension of particles on at least one surface of the article to provide a particulated mask covering from about 40 to 92% of the coated surface area; and contacting the particulated surface with an etchant;

a glass article having an anti-glare surface having low sparkle from about 1 to about less than or equal to 7 as measured by PPD at 0° and 90°, haze, distinctness-of-image, surface roughness, and uniformity properties, as defined herein;

a slot coating apparatus including an in-line particle polishing device or module; or a display system that incorporates the glass article, as defined herein.

The method of making, the article, the display system, compositions, formulations, or any apparatus of the disclosure, can include the components or steps listed in the claim, plus other components or steps that do not materially affect the basic and novel properties of the compositions, articles, apparatus, or methods of making and use of the disclosure, such as particular reactants, particular additives or ingredients, a particular agent, a particular surface modifier or condition, or like structure, material, or process variable selected. Items that may materially affect the basic properties of the components or steps of the disclosure or that may impart undesirable characteristics to the present disclosure include, for example, a surface having objectionable high glare or high gloss properties, for example, having a sparkle, a haze, a distinctness-of-image, a surface roughness, a uniformity, or a combination thereof, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

Chemically strengthened glass is used in many handheld and touch-sensitive devices where resistance to mechanical damage is important to the visual appearance and functionality of the product. During chemical strengthening, larger alkali ions in a molten salt bath are exchanged for smaller mobile alkali ions located within a certain distance from the glass surface. This ion exchange process places the surface of the glass in compression, allowing it to become more resistant to any mechanical damage it is commonly subjected to during use.

Reduction in the specular reflection (a significant factor in glare) from these display surfaces is often desired, especially by manufacturers whose products are designed for outdoor use where glare can be exacerbated by sunlight.

One way to reduce the intensity of the specular reflection, quantified as gloss, is to roughen the glass surface or cover it with a textured film. The dimensions of the roughness or texture should be large enough to scatter visible light, producing a slightly hazy or matte surface, but not too large as to significantly affect the transparency of the glass. Textured or particle-containing polymer films can be used if maintaining the properties of the glass substrate (e.g., scratch resistance) are not important. While these films maybe cheap and easy to apply, they are easily subject to abrasion which reduces the functionality of the device.

Another approach to roughening the glass surface is chemical etching. U.S. Pat. Nos. 4,921,626, 6,807,824, 5,989,450, and WO2002053508, mention glass etching compositions and methods of etching glass with the compositions. Wet etching is a method of generating an anti-glare surface on the glass while preserving its inherent mechanical surface properties. During this process, the glass surface is selectively exposed to chemicals which degrade the surface to the correct roughness dimensions for the scattering of visible light. When micro-structural regions having differential solubility are present, such as in soda lime silicate glasses, a roughened surface can be formed by placing the glass in a (typically fluorine-containing) mineral acid solution. Such selective leaching or etching is generally ineffective at generating a uniform, anti-glare surface on other display glasses lacking such differentially soluble micro-structural regions, such as alkaline earth aluminosilicates and mixed alkali borosilicates, and for alkali and mixed alkali aluminosilicates containing lithium, sodium, potassium, or a combination thereof.

One result of roughening a glass surface is to create "sparkle," which is perceived as a grainy appearance. Sparkle is manifested by the appearance of bright and dark or colored spots at approximately the pixel-level size scale. The presence of sparkle reduces the view-ability of pixilated displays, particularly under high ambient lighting conditions.

In embodiments, the disclosure provides a wet etch method for generating an anti-glare surface on the glass while preserving its inherent mechanical surface properties. During this process, a particulated glass surface is exposed to chemicals which can degrade the surface to alter the surface roughness dimensions that are responsible for scattering visible light. When significant quantities of mobile alkali ions are present in the glass, such as in soda lime silicate glasses, a roughened surface can be formed by, for example, contacting the glass surface in an acid etchant solution, such as a solution containing fluoride ion.

In embodiments, the disclosure provides a process to form a nano- to micro-scale textured surface on silicate glasses with improved optical properties. The process involves 1) a partial coverage of particles on the glass surface, 2) allowing the solvent to dry off, which is sufficient to promote adhesion of the particles onto the glass surface and without additional or external heating. The process can be followed by 3) etching in an HF bath, or multi-component acid solution. The HF solution creates preferential etching around particles on the glass surface to form an AG roughened surface layer.

One process to produce anti-glare layer on the Gorilla® glass surface is to apply 100% coverage of small polymer beads followed by the drying and etching steps. When coating 100% coverage, sample quality often suffers with respect to increased sparkle. Low sparkle is a "must" requirement by certain display glass customers and high material coverage (100%) rarely yields low sparkle results. The present disclosure provides partial etch mask coverage that has substantial benefits compared to 100% coverage. Some benefits that have been achieved in embodiments of the present disclosure include, for example:

low sparkle, in the 5 to 6 range (note that 100% particle coverage typically results in sparkle in the 8 to 12 range);

low sparkle, with low haze, and low DOI;

low sparkle, with low haze, and medium DOI;

low sparkle with a variety of optical combinations (e.g., high haze/low DOI; low haze/medium DOI, etc.);

with partial mask coverage, multiple optical targets could be achieved by simply changing the acid etch concentration;

easy to control the mask coverage by changing the coating thickness, bead loading, or both;

samples can be etched in horizontal, vertical, or both configurations;

cost saving by having less mask material consumption since less surface coverage is needed; and different mask deposition processes (e.g., slot coating and spray coating) can obtain similar optical results when samples have partial coverage.

Optical modeling suggests that to achieve low sparkle, the lateral spacing between particles should be less than about 20 microns. That means the particle size distributions must be very carefully controlled. With partial mask coverage, one can have larger unmasked space between particles so that an inexpensive, broad particle size distribution can be selected.

In embodiments, the disclosure provides a method of making an article having an anti-glare surface, comprising:

slot coating a suspension of particles on at least one surface of the article to provide a particulated mask covering from about 40 to 92% of the coated surface area; and contacting the at least one surface of the article having the slot coated particles and an etchant to form the anti-glare surface.

In embodiments, the at least one surface of the article can be, for example, a glass, a composite, a ceramic, a plastic or resin based material, and like materials, or combinations thereof. In embodiments, the deposited particles can be, for example, a glass, a composite, a ceramic, a plastic or resin based material, a wax, a metal, a salt, a clay, a polymer, a copolymer, nano-particles, cross-linked polymer particles, UV cured particles, and like materials, or combinations thereof. In embodiments, the etchant can be comprised of at least one acid suitable for etching the surface beneath the deposited particles.

In embodiments, the glass surface and the glass particles when selected can be independently selected from, for example, at least one aluminosilicate, aluminoborosilicate, soda lime, borosilicate, silica, and like glasses, or a combination thereof, and the etchant can comprise at least one acid selected from HF, $H_2SO_4$, $HNO_3$, HCl, $CH_3CO_2H$, $H_3PO_4$, and like acids, or a combination thereof.

Additionally or alternatively, the contacting the at least one surface with particles can be accomplished with a concentrated particle suspension, or a particle suspension of intermediate concentration. The particle-surface contacting or particle depositing can be accomplished using any suitable method, for example, slot-coating, spin-coating, spray-coating, roll-coating, laminating, brushing, dipping, and like application methods, or a combination thereof. The deposited particles can have, for example, a $D_{50}$ diameter of from about 0.1 to about 10 micrometers, from about 1 to about 10 micrometers, and from about 1 to about 5 micrometers, including intermediate values and ranges. In embodiments, the particle size range can be, for example, from about 0.1 to about 50 micrometers, 1 to about 30 micrometers, and like particle diameters including intermediate values and ranges.

In embodiments, the contacting of the particulated surface with an etchant can be accomplished by, for example, exposing the surface having the deposited particles to the etchant, for example, for from about 1 second to about 30 minutes, including intermediate values and ranges.

In embodiments, the preparative method can optionally further include, for example, washing the resulting etched anti-glare surface, chemically strengthening the anti-glare surface, applying a functional coating or film (e.g., a light sensitive or polarizing film) or protective surface coating or film, and like coatings or films, or a combination thereof.

In embodiments, when a single-side acid-etch, or like modification is desired on a sheet of glass, one side of the glass can be protected from the etching solution. Protection can be achieved, for example, by applying an insoluble non-porous coating such as an acrylic wax, or a laminate film having an adhesive layer, for example, an acrylic, a silicone, and like adhesives materials, or combinations thereof. Protective coating application methods can include, for example, brushing, rolling, spraying, laminating, and like methods. The acid-etch exposed insoluble non-porous protective coating survives the etching process and can be readily removed after the etching. Removing the protective film from the surface of the article can be accomplished using any suitable method, such as contacting the protective film with a dissolving liquid, heating the film to liquefy and drain, and like methods and materials, or a combination thereof. Thus, the preparative method can optionally further include, prior to etching, contacting at least another surface, e.g., a second surface such as the backside of a glass sheet, of the article with an optionally removable, etch-resistant protective layer.

In embodiments, the disclosure provides an article prepared by any of the preparative processes disclosed herein, such as a glass article prepared by the above mentioned particle deposition and etching process.

In embodiments, the at least one surface of the article can be a glass, the deposited particles can be a polymer, a wax, or mixtures or combinations thereof, and the etchant can be at least one acid.

In embodiments, the disclosure provides a glass article comprising: at least one anti-glare surface having:

a haze of, for example, from about 0.1 to about 30, such as from about 0.1 to about 25, from about 0.1 to about 20, from about 0.1 to about 10, and from about 1 to about 10, and low haze, such as from about 0.1 to about 5, and from about 1 to about 5, including intermediate values and ranges;

a distinctness-of-image (DOI 20°) of, for example, from about 25 to about 85, from about 40 to about 80, from about 45 to about 75, and from about 50 to about 70, including intermediate values and ranges;

a surface roughness (Ra) of, for example, from about 50 to about 500 nm, and from about 100 to about 300 nm, including intermediate values and ranges;

an average roughness peak-to-valley profile of from about 0.1 to about 10 micrometers, including intermediate values and ranges; and low sparkle from about less than or equal to 7 as measured by PPD at 0° and 90°.

In embodiments, the glass article having the anti-glare surface of the disclosure can comprise a distribution of topographic features having an average diameter of about 1 to about 100 micrometers, about 1 to about 50 micrometers, including intermediate values and ranges.

In embodiments, the disclosure provides a display system including, for example:

a glass panel having at least one roughened anti-glare surface having:

a haze of from about 0.1 to less than about 30 including intermediate values and ranges;

a distinctness-of-image (DOI 20°) of from about 40 to about 80, including intermediate values and ranges;

a surface roughness (Ra) of from about 100 to about 300 nm, including intermediate values and ranges; and an average roughness peak-to-valley difference profile of from about 0.1 to about 10 micrometers, including intermediate values and ranges;

low sparkle from about less than or equal to 7 as measured by PPD at 0° and 90°; and an optional pixelated image-display panel adjacent to the glass panel.

In embodiments, the disclosure provides a method of creating an anti-glare glass surface having low sparkle properties, including, for example:

contacting a glass surface with a liquid suspension of suitable particles, the contacting can be accomplished by slot coating with the liquid suspension to provide a particle-coated glass surface with a surface area coverage of about 40 to about 92%, of about 50 to about 91%, or of about 60 to about 90%, of the coated area; and contacting the resulting particulated glass surface and an etchant to form the anti-glare surface, where the resulting an anti-glare surface has low sparkle from about 1 to about less than or equal to 7 as measured by PPD at 0° and 90°.

In embodiments, the disclosure provides a wet etch process to form a uniform, nano- to micro-scale textured surface on most silicate glasses and without having a significant impact on chemical strengthening capability of the glass. The process includes depositing or otherwise coating suitable particles, such as glass, polymer, or composite particles, on the glass surface, followed by acid etching, such as in an HF, or multi-component acid solution. In embodiments, the HF solution can preferentially etch around the particles deposited on the glass surface, then subsequently erodes the particles from the etched surface, and can also reduce the surface roughness.

In embodiments, the desired reduced gloss or glare levels can be obtained, for example, by adjusting at least one or more of the following parameters: the viscosity of the particulate suspension, the binder level in the suspension, the level or concentration of the glass or like particles in the suspension, the concentration of the acid etchant, etchant types, the amount of particles deposited on the surface, the particle size distribution (PDS) of the particles used, and the exposure interval or the time that the particle-bearing surface of the glass sample is in contact with the acid etchant.

In embodiments, an anti-glare glass article is provided. The glass article can be ion-exchangeable and can have at least one roughened surface. The roughened surface has a distinctness-of-reflected image (DOI) of less than 90 when measured at an incidence angle of 20° (DOI at 20°). A pixelated display system that includes the anti-glare glass article is also provided. The glass article can be, for example, a planar sheet or panel having two major surfaces joined on the periphery by at least one edge, although the glass article can be formed into other shapes such as, for example, a three-dimensional shape. At least one of the surfaces is a roughened surface including, for example, topological or morphological features, such as, projections, protrusions, depressions, pits, closed or open cell structures, particles, islands, lands, trenches, fissures, crevices, and like geometries and features, or combinations thereof.

In embodiments, the disclosure provides an aluminosilicate glass article. The aluminosilicate glass article can include, for example, at least 2 mol % $Al_2O_3$, can be ion-exchangeable, and can have at least one roughened surface. The aluminosilicate glass article can have at least one roughened surface comprising a plurality of topographical features. The plurality of topographical features can have an average characteristic largest feature size (ALF) of from about 1 micrometer to about 50 micrometers.

In embodiments, the disclosure provides a display system. The display system can include, for example, at least one glass panel and a pixelated image-display panel adjacent to the glass panel. The image-display panel can have a minimum native pixel pitch dimension. The average characteristic largest feature size (ALF) of the glass panel can be less than the minimum native pixel pitch dimension of the display panel. The pixelated image display panel can be, for example, one of an LCD display, an OLED display, or like display devices. The display system can also include touch-sensitive elements or surfaces. The glass can be, for example, any of the aforementioned glasses, such as an aluminosilicate ion-exchanged glass that has at least one roughened surface including a plurality of features having an ALF, and the image-displaying panel has a minimum native pixel pitch. The minimum native pixel pitch can be, for example, greater than the ALF of the roughened surface of the glass panel.

ALF is measured in the plane of (i.e., parallel to) the roughened glass surface, and is therefore independent of roughness. ALF is a measurement of feature variation in the x- and y-directions, i.e., in the plane of the roughened glass surface. Selecting the largest characteristic features is a useful distinction from other methods that determine a more global average feature size. The largest features are most easily seen by the human eye and are therefore most important in determining visual acceptance of the glass article. In embodiments, the topological or morphological features of the at least one roughened surface has an average characteristic largest feature (ALF) size of from about 1 micrometer to about 50 micrometers, of from about 5 micrometers to about 40 micrometers; of from about 10 micrometers to about 30 micrometers; and from about 14 micrometers to about 28 micrometers, including intermediate values and ranges. The average characteristic largest feature size is the average cross-sectional linear dimension of the twenty largest repeating features within a viewing field on a roughened surface. A standard calibrated optical light microscope can typically be used to measure feature size. The viewing field is proportional to the feature size, and typically has an area of approximately 30(ALF)×30(ALF). If, for example, the ALF is approximately 10 micrometers, then the viewing field from which the twenty largest features are selected is approximately 300 micrometers×300 micrometers. Small changes in the size of the viewing field do not significantly affect ALF. The standard deviation of the twenty largest features that are used to determine ALF should generally be less than about 40% of the average value, i.e., major outliers should be ignored since these are not considered "characteristic" features.

The topography of the anti-glare surface can include, for example, features such as protrusions or projections, depressions, and like features having a maximum dimension of less than about 400 nm. In embodiments, these topographical features can be separated from each other or spaced apart at a mean distance of from about 10 nm up to about 200 nm. The resulting anti-glare surface can have an average roughness, as measured by the peak-to-valley difference (PV) measure on the surface. In embodiments, the anti-glare surface can have a RMS roughness of about 800 nm, of about 500 nm, and about 100 nm.

The features used to calculate ALF are "characteristic;" i.e., at least twenty similar features can be located in the proportional viewing field. Different morphologies or surface structures can be characterized using ALF. For example, one surface structure may appear to be closed-cell repeating structures, another may appear to be small pits separated by large plateaus, and a third may appear to be a field of small particles punctuated by intermittent large smooth regions. In each instance, the ALF is determined by measuring the twenty largest repeating surface regions that are substantially optically smooth. In the instance of the repeating closed cell surface structure, the features to be measured are the largest of the cells in the closed-cell matrix. For the surface structure comprising small pits separated by large plateaus, the large plateaus between pits are to be measured. For the surface comprising a field of small particles punctuated by intermittent large smooth regions, the intermittent large smooth regions are to be measured. All surfaces with substantially varying morphologies can thus be characterized using ALF.

In embodiments, the at least one roughened surface of the glass article has an average RMS roughness can be from about 10 nm to about 800 nm, from about 40 nm to about 500 nm, and from about 40 nm to about 300 nm. In embodiments, the average RMS roughness can be greater than about 10 nm and less than about 10% of the ALF, greater than about 10 nm and less than about 5% of ALF, and greater than about 10 nm and less than about 3% of ALF.

The specification of low DOI and high Ros/Rs provide constraints on the characteristic feature size and ALF. For a given roughness level, it has been found that larger feature sizes result in lower DOI and higher Ros/Rs. Therefore, to balance the display sparkle and the DOI target, in embodiments, it can be desirable to create anti-glare surfaces having an intermediate characteristic feature size that is neither too small nor too large. It is also desirable to minimize reflected or transmitted haze when the transmitted haze is scattering into very high angles that can cause a milky white appearance of a roughened article under ambient lighting.

"Transmission haze," "haze," or like terms refer to the percentage of transmitted light scattered outside an angular cone of ±4.0° according to ASTM D1003. For an optically smooth surface, the transmission haze is generally close to zero. Transmission haze of a glass sheet roughened on two sides ($Haze_{2-side}$) can be related to the transmission haze of a glass sheet having an equivalent surface that is roughened on only one side ($Haze_{1-side}$), according to the approximation of eq. (2):

$$Haze_{2-side} \approx [(1-Haze_{1-side}) \cdot Haze_{1-side}] + Haze_{1-side} \qquad (2).$$

Haze values are usually reported in terms of percent haze. The value of $Haze_{2-side}$ from eq. (2) must be multiplied by 100. In embodiments, the disclosed glass article can have a transmission haze of less than about 50% and even less than about 30%.

A multistep surface treatment process has been used to form the roughened glass surface. An example of a multistep etch process is disclosed in commonly owned copending U.S. Provisional Patent Appln 61/165,154, filed Mar. 31, 2009, to Carlson, et al., entitled "Glass Having Anti-Glare Surface and Method of Making," where a glass surface is treated with a first etchant to form crystals on the surface, then etching a region of the surface adjacent to each of the crystals to a desired roughness, followed by removing the crystals from the glass surface, and reducing the roughness of the surface of the glass article to provide the surface with a desired haze and gloss.

Other related commonly owned applications include, for example, U.S. Ser. No. 13/090,561 (SP10-112), U.S. Ser. No. 13/090,522 (SP10-114), U.S. Ser. No. 61/417,674 (SP10-318P), U.S. provisional application U.S. Ser. No. 61/165,154 (SP09-087P), and U.S. provisional application US Ser. No. 61/242,529 (SP09-271P), which disclosures are incorporated herein in their entirety.

In embodiments, various performance enhancing additives can be included in the particle suspension, the etch solution, or both, including for example, a surfactant, a co-solvent, a diluent, a lubricant, a gelation agent, a viscosity improver, and like additives, or combinations thereof.

The contacting with etchant can involve, for example, selective partial or complete dipping, spaying, immersion, and like treatments, or a combination of treatments, with an acidic etch solution including, for example, 2 to 10 wt % hydrofluoric acid and 2 to 30 wt % of a mineral acid, such as hydrochloric acid, sulfuric acid, nitric acid, phosphoric acid, and like acids, or combinations thereof. The glass surface can be etched in the solution for periods of from about 1 to about 10 minutes, with longer times generally leading to a greater reduction in the surface roughness. The disclosed concentrations and etch times are representative of suitable examples. Concentrations and etch times outside the disclosed ranges can also be used to obtain the roughened surface of the glass article albeit potentially less efficiently.

In chemical strengthening, larger alkali metal ions are exchanged for smaller mobile alkali ions near the glass surface. This ion-exchange process places the surface of the glass in compression, allowing it to be more resistant to any mechanical damage. In embodiments, the outer surface of the glass article can optionally be ion-exchanged where smaller metal ions are replaced or exchanged by larger metal ions having the same valence as the smaller ions. For example, sodium ions in the glass can be replaced with larger potassium ions by immersing the glass in a molten salt bath containing potassium ions. The replacement of smaller ions with larger ions creates a compressive stress within the layer. In embodiments, the larger ions near the outer surface of the glass can be replaced by smaller ions, for example, by heating the glass to a temperature above the strain point of the glass. Upon cooling to a temperature below the strain point, a compressive stress is created in an outer layer of the glass. Chemical strengthening of the glass can optionally be performed after the surface roughening treatment, with little negative effect on the ion-exchange behavior or the strength of the glass article.

In embodiments, the disclosure provides a method for making an anti-glare surface including, for example, "particulating" (i.e., populating) the surface with particles, such as with a liquid suspension or a soot gun, etching the particulated surface with a suitable etchant, ion-exchanging the etched surface, and optionally accomplishing further processing to reduce objectionable surface flaws (i.e., flaw reduction). Alternatively or additionally, the surface can be ion-exchanged, particulated with particles, etched with an etchant, and optionally flaw reduction processing.

Referring to the figures, FIG. 1 schematically shows the steps in the process of creating an anti-glare layer on, for example, a GORILLA® glass surface. Particles having an average size, such as less than about 10 micrometers, are suspended in a suitable liquid, and the resulting suspension can be selectively deposited (100), for example, slot coated onto a glass substrate, and the solvent removed to leave a residual layer of particles (105) adhered on the glass substrate (110). The sample can then be etched, such as by being dipped into or immersed in an acid etch (120) bath. The $HF/H_2SO_4$ etchant attacks the area around the particles and eventually under-cuts the area covered by individual particles. The glass particles are liberated from the substrate surface during the etch (120), during rinsing, or both, and thus create a textured surface (130) on the glass substrate having anti-glare properties.

Figure 2:
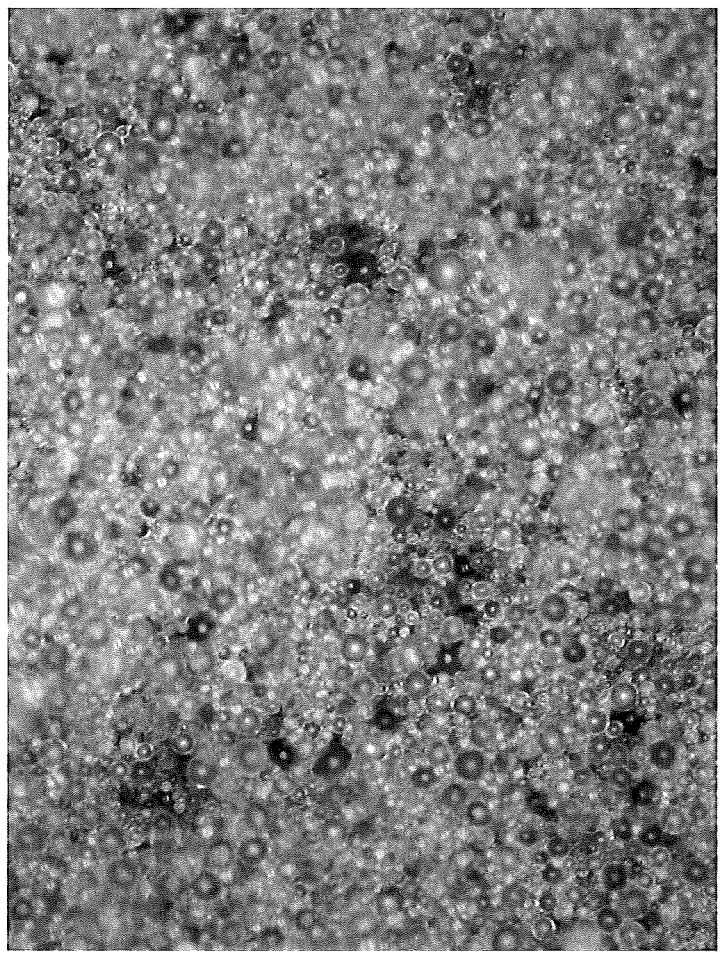

FIG. 2 shows a micrograph of a Gorilla® glass coated (particulated) sample that is ready for etching. The sample has 100% particle coverage that was obtained by applying the particles by spray. No opening between the particles can be seen. The coated layer is also relatively very thick (120 micron).

Figure 3A:
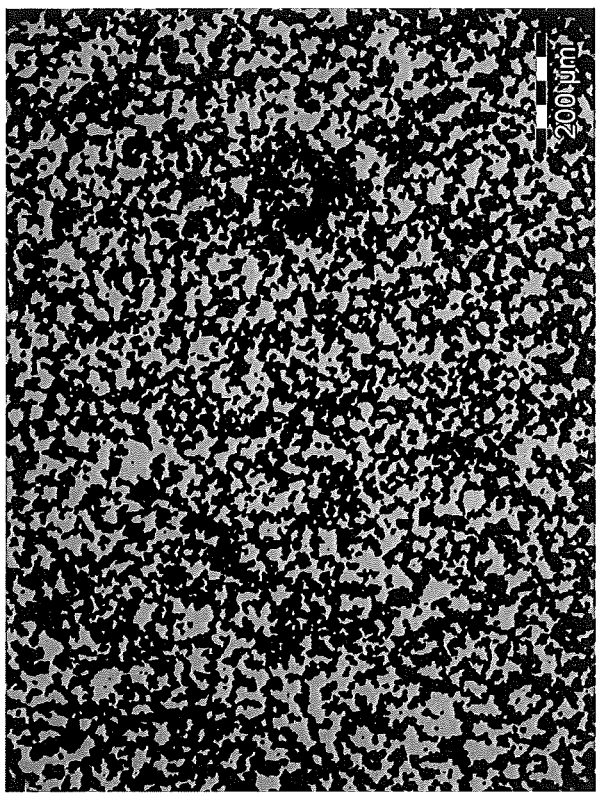
Figure 3B:
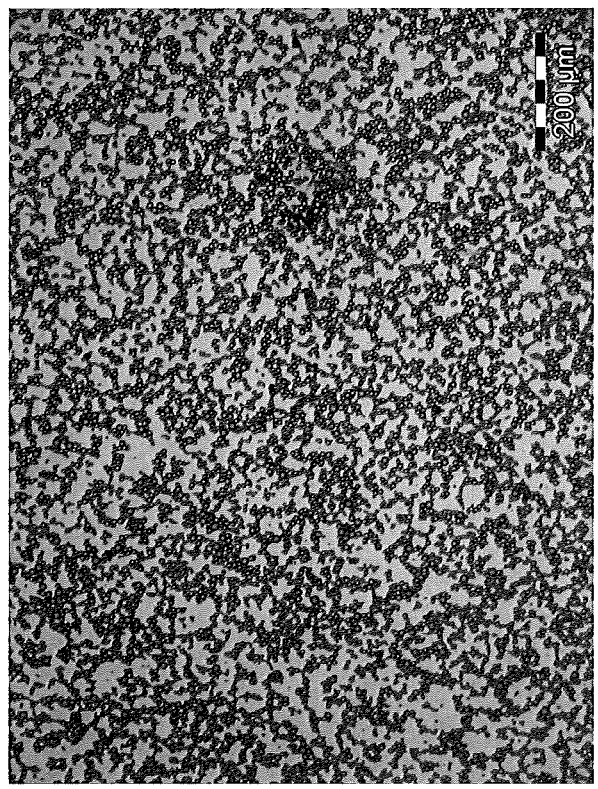

FIGS. 3a and 3b show, respectively, before analysis (3a) and after applying the image analysis (3b) to determine the percent coverage for 3 micrometer particle deposition for an exemplary slot coated sample at 100× magnification. FIG. 3b has 60% area coverage.

FIGS. 4a and 4b show, respectively, the exact same image location captured in FIGS. 3a and 3b but at 500× magnification. FIG. 4b has 61% area coverage. A 3 micron polystyrene bead (only) particle suspension was used.

FIGS. 5a and 5b show another slot sample having a different area coverage of 74% at 500× magnification. A 3 micron polystyrene bead (only) particle suspension was used.

FIGS. 6a and 6b show another slot coated sample with a different area coverage of 83% at 500× magnification. A 3 micron polystyrene bead (only) particle suspension was used.

FIGS. 7a and 7b show another slot coated sample having a particle surface area coverage of 92% at 500× magnification. A 3 micron polystyrene bead (only) particle suspension was used.

FIGS. 8a and 8b show still another slot coated sample of a mixed particle formulation having a mixed particle surface area coverage of 61% at 100× magnification. The formulation used was a particle suspension of a mixture of polymer beads (PMMA; 8 microns) and wax (6 microns) particles, i.e., gross mixture of polymer and wax particles and not particles comprised of and intimate physical mixture or blend of polymer and wax.

FIGS. 9a and 9b show another slot coated sample having a coated particle surface area coverage of 43% at 500× magnification. A 5 micron polystyrene (only) particle suspension formulation was used.

Figure 10A:
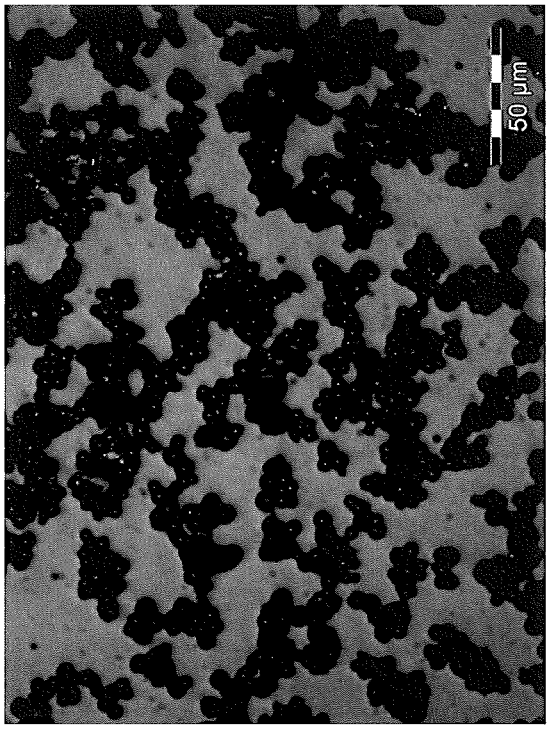
FIGS. 10a and 10b show another slot coated sample having a coated particle surface area coverage of 52% at 500× magnification.
Figure 10B:
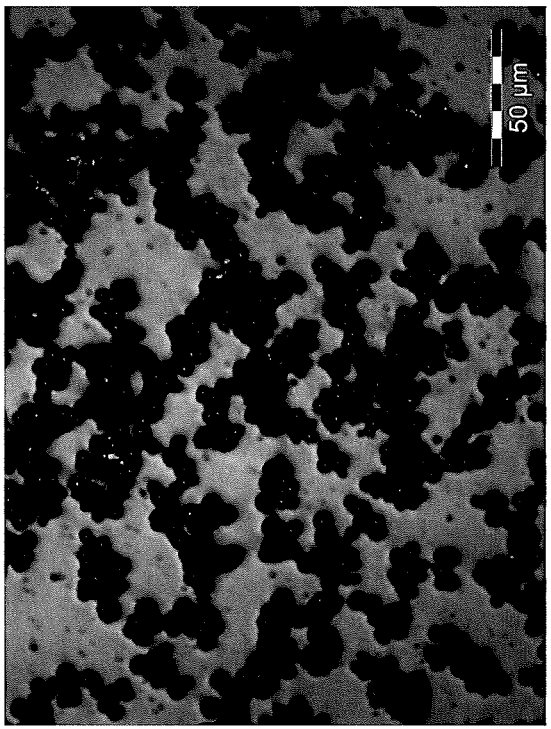

FIGS. 10a and 10b show another slot coated sample having a coated particle surface area coverage of 52% at 500× magnification. A particle suspension having 5 micron polymethylmethacrylate (PMMA) particles suspended in a suitable liquid, such as the first three entries in Table 2, was used.

Figure 11A:
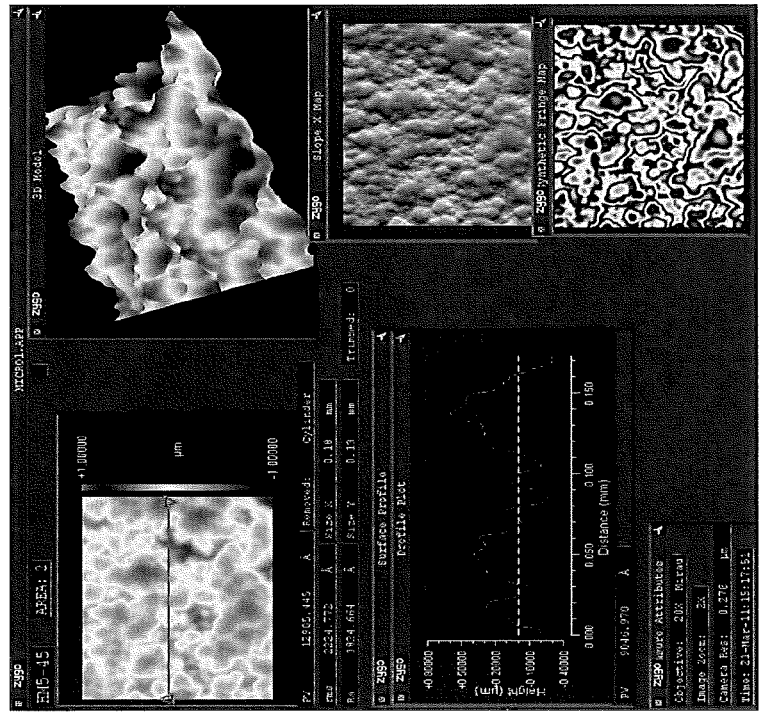
FIGS. 11a and 11b show the roughness of a 3 micron polystyrene (only) particle formulation coated at 74% (140 nm RMS) and 83% (224 nm RMS) area coverage, respectively.
Figure 11B:
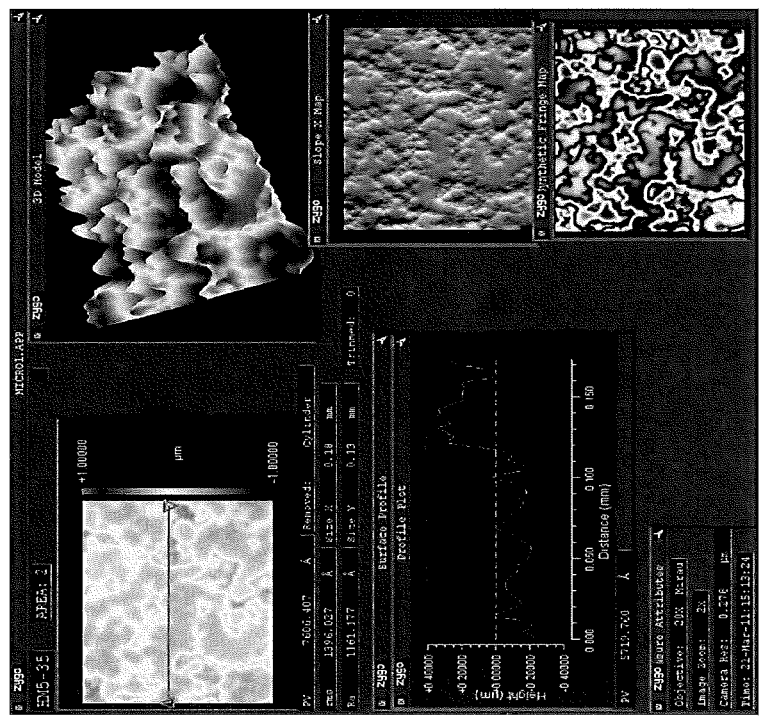

FIGS. 11a and 11b show the roughness of a 3 micron polystyrene (only) particle formulation coated at 74% and 83% area coverage, respectively. Both images were captured with a 20× objective, and 2× image zoom.

In embodiments, the disclosed method and article can provide at least one or more of the following advantages. The disclosed etch method can be accomplished quickly, for example, in from about 1 to about 10 minutes, in from about 1 to about 5 minutes, such as in from about 2 to about 4 minutes, to create an anti-glare layer on a glass surface. A conventional multi-bath method can take about 60 minutes or more. The disclosed etch method can use a single chemical etchant bath (e.g., HF+$H_2SO_4$) instead of three or more baths used in conventional processes.

In embodiments, the disclosed method can etch away, for example, from about 1 to about 50 micrometers of the substrate being etched (i.e., into the plane of the substrate or the z-direction), from about 1 to about 30 micrometers of the substrate, from about 1 to about 20 micrometers of the substrate, from about 1 to about 10 micrometers of the substrate, including intermediate values and ranges, to create a desired anti-glare layer. In contrast, a conventional etch process can typically remove about 100 to about 200 micrometers of the glass surface.

Samples prepared with the disclosed process show similar optical properties (e.g., haze, gloss, and distinctness of image (DOI)) when compared with samples etched with a conventional process, but the present method and samples are advantaged by having substantial reductions in process time, material consumption, and costs. The disclosed process is readily scaled-up for large parts, such as a one square meter glass sheet, and above, while a conventional dip process is less readily scalable for larger units.

With a proper design selection, the disclosed process does not need backside protection to make single-sided samples. Single-sided samples can be prepared using for example, single-side dip, spray, slot die coating, or spin coating methods. A multi-bath conventional process needs backside protection film, which can further increase manufacturing costs.

In embodiments, the method of making can further comprise an optional particle formulation polishing step, where the suspension of particles are, for example, ball milled, and more preferably the suspension of particles are milled in close proximity in time and place to the slot die coater head, just prior to slot coating the particle formulation on at least one surface with a slot die coater. In embodiments, the method of making includes polishing the particle formulation just prior to slot die coating. In embodiments, the method of making includes polishing the particle formulation in a polishing mill just prior to slot die. In embodiments, the method of making can include use of an apparatus having a polishing mill disposed just prior to slot die coating head.

In embodiments, the coating method as illustrated in FIG. 1 can be further improved by incorporating a so-called particle "polishing" step of the particle dispersion prior to a slot coating of the dispersion. Particles having an average size less than about 10 micrometers can be suspended in a suitable liquid. The dispersion can then be polished to homogenize it as a uniform dispersion (i.e., no settling), then the resulting suspension can be deposited, for example, by slot coating onto a glass substrate, and the solvent can be removed by, for example, evaporation or other methods, such as vacuum or drying, to leave a residual partial layer of particles adhered on the glass substrate. The sample can then be dipped into or immersed in an acid etch bath. The HF/$H_2SO_4$ etchant attacks the area around the particles and eventually under-cuts the area covered by individual particles. The particles, if any remain on the substrate surface after etching, can be removed from the substrate surface with a rinsing step. The resulting glass substrate has anti-glare properties.

Figure 12:
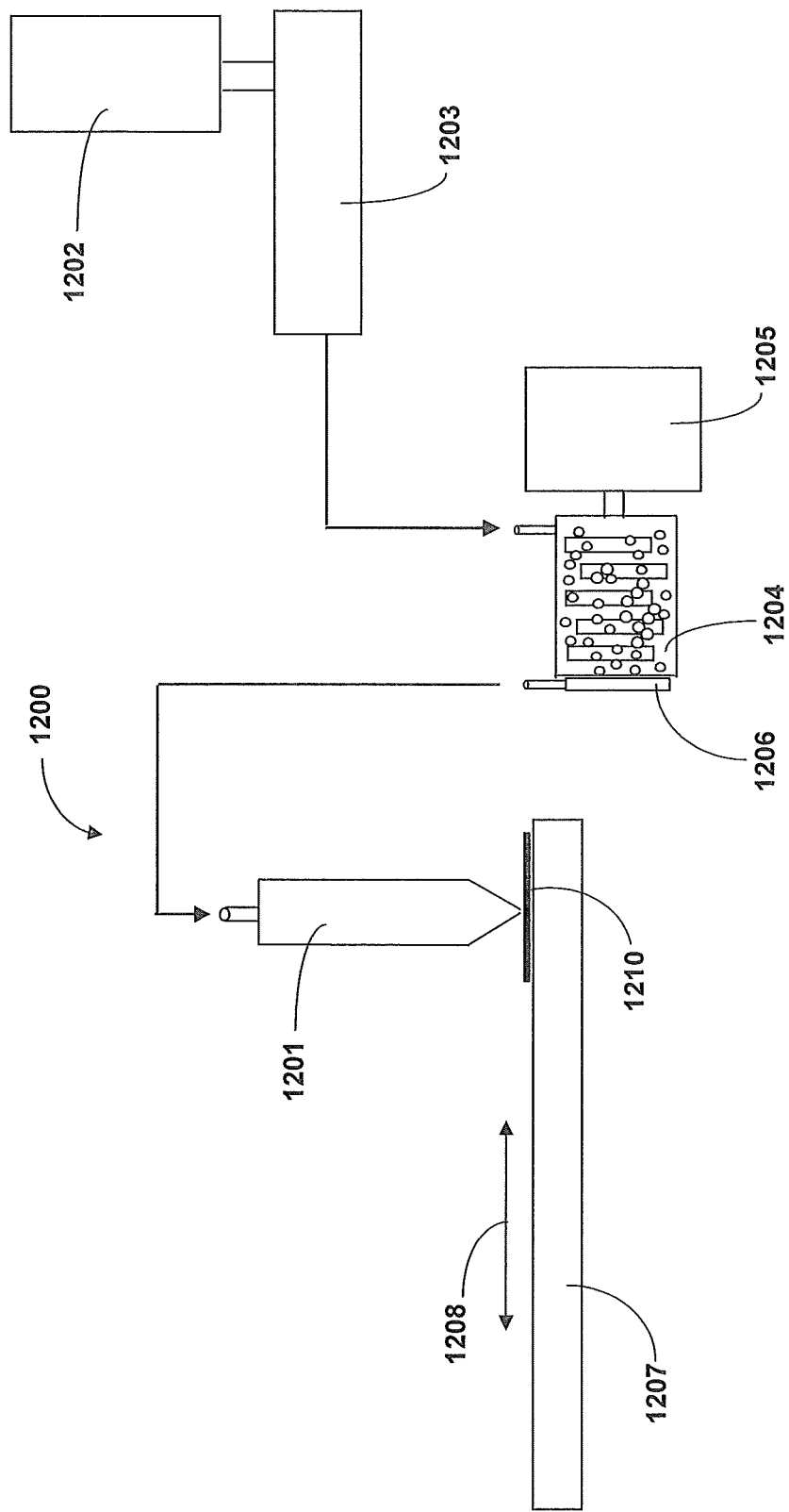
FIG. 12 shows a slot coater apparatus (1200) including an in-line polishing device.
Figure 13C:
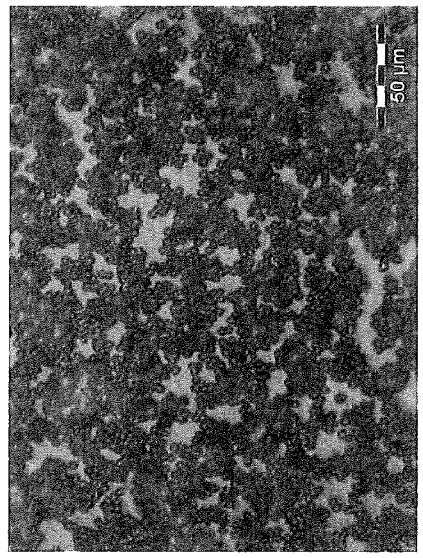
FIGS. 13A to 13D show micrographs of Gorilla® glass coated with un-polished dispersions.
Figure 13D:
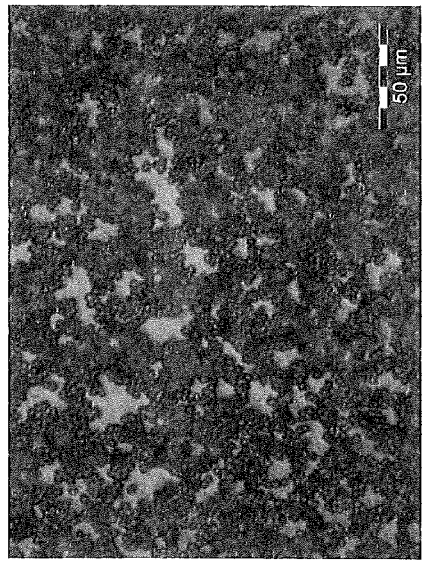
Figure 13A:
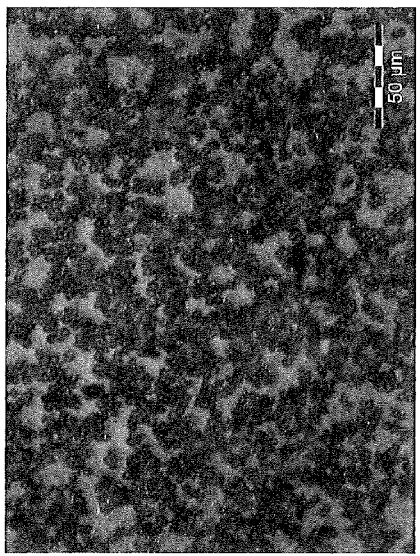
Figure 13B:
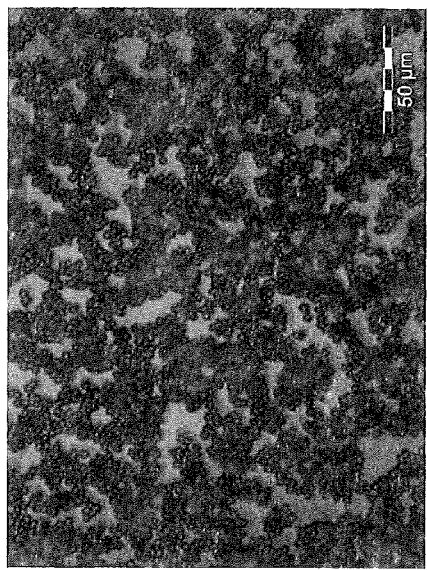
Figure 14A:
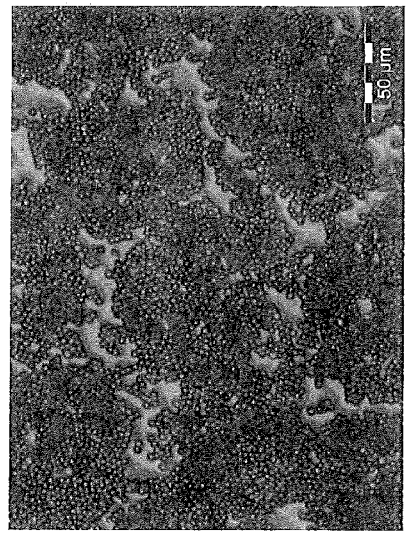
FIGS. 14A to 14D show micrographs of Gorilla® glass coated with polished dispersions.
Figure 14B:
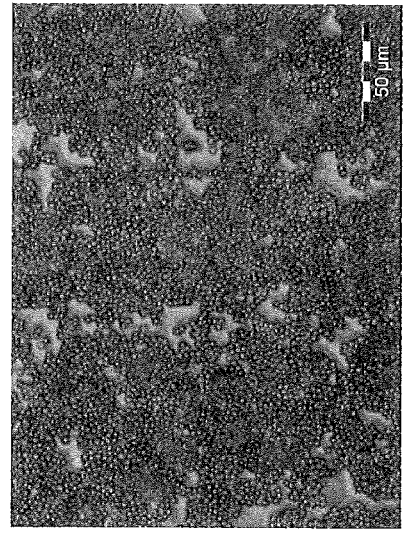
Figure 14C:
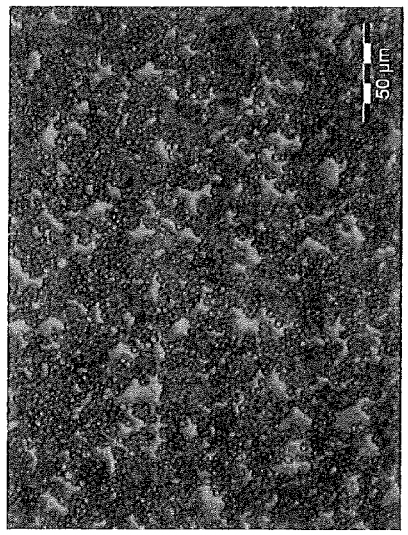
Figure 14D:
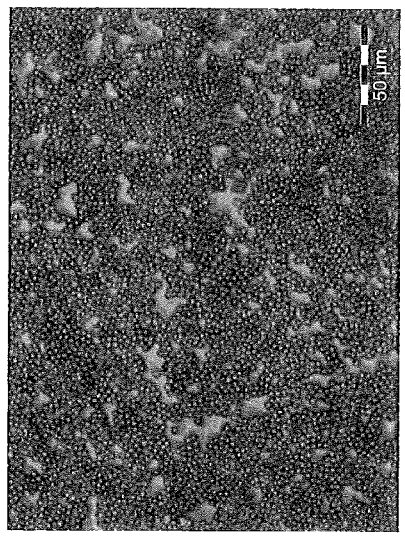

In embodiments, the disclosure provides a slot coater apparatus and system (1200) as illustrated in FIG. 12, comprising:

a slot die (1201);

a source of a particle suspension (1202), the source of the particle suspension can be driven by any suitable pump (1203) or like propellant device or force such as gravity; and a polisher (1204) situated between the source of the particle suspension and the slot die, wherein the polisher continuously polishes the particle suspension during slot coating and feeds the polished particles to the slot die head for coating.

The polisher (1204) can include, for example, a motor (1205) for driving the polisher, and a screen (1206) or like filter member to retain, for example, large milling media, such as ball bearings or shot. In embodiments, the polisher can be, for example, a high speed mixer or an opposed microfluidic stream mixing chamber.

The continuously polished particle stream is delivered to the slot die (1201) and controllably deposited on a glass substrate (1207) in desired thicknesses. The slot die (1201) and the glass substrate (1207) are preferably in relative motion (1208) to promote deposition of uniformly thick particle masks.

In embodiments, the suspension of particles for the particle mask formulation can further include an anionic surfactant in the formulation.

In embodiments, the disclosure provides a method for obtaining anti-glare surfaces having low haze properties. The method includes a process to form a nano- to micro-scale textured surface on, for example, a silicate glass having haze reduction (e.g., having haze less than 5%) while maintaining other optical properties. The method involves coating particles on a glass surface, allowing the solvent to escape, such as evaporation or heat-drying, which escape method is sufficient to promote adhesion of the deposited particles onto the glass surface. This process is followed by etching in, for example, an HF etchant bath, or multi-component acid solution. The etchant preferentially etches around the particles on the glass surface to form an AG roughened surface layer.

Haze becomes an important optical characteristic when device contrast is an issue. This disclosure provides a method of making AG samples by adding a surfactant into the formulation to make low haze while maintaining others optical attributes in an acceptable range. Other advantages include, for example:

Haze of less than about 5% can be achieved with low sparkle and acceptable DOI.

Use of a surfactant facilitates achieving desired optical properties, and also facilitates achieving desired coating uniformity properties. The results are highly repeatable.

The use of a selected surfactant in the particle dispersion formulation permits one to achieve a wide range of AG optical properties.

The use of a selected surfactant in the particle dispersion formulation also permits cost saving by using less material in the particle mask. For comparative formulations free of surfactant, the mask can be coated to a 45 microns wet thickness to obtain a sparkle lower than 7 and a haze of about 8. Addition of a surfactant into the particle mask coating formulation can be coated to a wet thickness of 35 microns and the measured haze is less than 5%. The particle mask formulation material consumption can be reduced, for example, by about 22%.

Generally, a surfactant can be used to improve the wetting of the substrate surface. However, in the present methods inclusion of a surfactant in the particle mask formulation appears to assist in lubrication of the mask particles, and the milling beads if present, such as in the polisher, and in releasing the mask particles from the substrate surface during the etching step. These events help to achieve low haze while maintaining other desired optical attributes for AG.

A workable anionic surfactant concentration range can be, for example, from 0.1% to 2% wt based on the total weight of the particulate dispersion prior to slot die coating.

Suitable anionic surfactants can be, for example, Silwet Hydrostable 212 (available from Momentive Performance Materials), Q2-5211 Super wetter (available from Dow Corning), Novec-FC4430 (available from 3M), Surfynol 104 (available from Air Products), and Dodecylbenzenesulfonic acid, sodium salt (available from Aldrich).

In embodiments, the glass article can comprise, consist essentially of, or consist of one of a soda lime silicate glass, an alkaline earth aluminosilicate glass, an alkali aluminosilicate glass, an alkali borosilicate glass, and combinations thereof. In embodiments, the glass article can be, for example, an alkali aluminosilicate glass having the composition: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the alkali metal modifiers are alkali metal oxides. In embodiments, the alkali aluminosilicate glass substrate can be, for example: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % $MgO$; and 0-3 mol % $CaO$. In embodiments, the alkali aluminosilicate glass substrate can be, for example: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %$\leq Li_2O+Na_2O+K_2O \leq 20$ mol % and 0 mol %$\leq MgO+CaO \leq 10$ mol %. In embodiments, the alkali aluminosilicate glass substrate can be, for example: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % $MgO$; and 0-5 mol % $CaO$, wherein: 66 mol %$\leq SiO_2+B_2O_3+CaO \leq 69$ mol %; $Na_2O+K_2O+B_2O_3+MgO+CaO+SrO > 10$ mol %; 5 mol %$\leq MgO+CaO+SrO \leq 8$ mol %; $(Na_2O+B_2O_3)-Al_2O_3 \leq 2$ mol %; 2 mol %$\leq Na_2O-Al_2O_3 \leq 6$ mol %; and 4 mol %$\leq (Na_2O+K_2O)-Al_2O_3 \leq 10$ mol %. In embodiments, the alkali aluminosilicate glass can be, for example: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % ($MgO+CaO+SrO+BaO$); 0-3 wt % ($SrO+BaO$); and 0-5 wt % ($ZrO_2+TiO_2$), wherein $0 \leq (Li_2O+K_2O)/Na_2O \leq 0.5$. In embodiments, the alkali aluminosilicate glass can be, for example, substantially free of lithium. In embodiments, the alkali aluminosilicate glass can be, for example, substantially free of at least one of arsenic, antimony, barium, or combinations thereof. In embodiments, the glass can optionally be batched with 0 to 2 mol % of at least one fining agent, such as $Na_2SO_4$, NaCl, NaF, NaBr, $K_2SO_4$, KCl, KF, KBr, $SnO_2$, at like substances, or combinations thereof.

In embodiments, the selected glass can be, for example, down drawable, i.e., formable by methods such as slot draw or fusion draw processes that are known in the art. In these instances, the glass can have a liquidus viscosity of at least 130 kpoise. Examples of alkali aluminosilicate glasses are described in commonly owned and assigned U.S. patent application Ser. No. 11/888,213, to Ellison, et al., entitled "Down-Drawable, Chemically Strengthened Glass for Cover Plate," filed Jul. 31, 2007, which claims priority from U.S. Provisional Application 60/930,808, filed May 22, 2007; U.S. patent application Ser. No. 12/277,573, to Dejneka, et al., entitled "Glasses Having Improved Toughness and Scratch Resistance," filed Nov. 25, 2008, which claims priority from U.S. Provisional Application 61/004,677, filed Nov. 29, 2007; U.S. patent application Ser. No. 12/392,577, to Dejneka, et al., entitled "Fining Agents for Silicate Glasses," filed Feb. 25, 2009, which claims priority from U.S. Provisional Application No. 61/067,130, filed Feb. 26, 2008; U.S. patent application Ser. No. 12/393,241, to Dejneka, et al., entitled "Ion-Exchanged, Fast Cooled Glasses," filed Feb. 26, 2009, which claims priority to U.S. Provisional Application No. 61/067,732, filed Feb. 29, 2008; U.S. patent application Ser. No. 12/537,393, to Barefoot, et al., entitled "Strengthened Glass Articles and Methods of Making," filed Aug. 7, 2009, which claims priority to U.S. Provisional Application No. 61/087,324, entitled "Chemically Tempered Cover Glass," filed Aug. 8, 2008; U.S. Provisional Patent Application No. 61/235,767, to Barefoot, et al., entitled "Crack and Scratch Resistant Glass and Enclosures Made Therefrom," filed Aug. 21, 2009; and U.S. Provisional Patent Application No. 61/235,762, to Dejneka, et al., entitled "Zircon Compatible Glasses for Down Draw," filed Aug. 21, 2009.

The glass surfaces and sheets described in the following example(s) can use any suitable particle-coatable and etchable glass substrate or like substrates, and can include, for example, a glass composition 1 through 11, or a combination thereof, listed in Table 1. Table 1 provides representative glass substrate compositions.

TABLE 1

Representative glass substrate compositions.

| Oxides (mol %) | Glass | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |
| $TiO_2$ | 0 | — | — | — | — | 0.64 | 0.66 | 0.056 | 0.004 | — | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | — | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | — | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to prepare the articles of the disclosure.

The following generally summarizes the steps of how the particle mask suspension was prepared, coated, and then etched. Corning 2318 glass (6"×10") specimens were washed in a Big Dipper automatic dish washer using about 4% semi-clean KG detergent in DI water. Glass sheets were then laminated on one side with backside protection film. Then the particle coat formulation was prepared by weighing out each component listed in Table 2. The binder was mixed in ethanol until completely dissolved. Butanol and particles or beads were then added. The particle concentrate contained in roller bottles was placed on rollers to keep the particles well suspended. The formulation was then spray coated or slot coated on the glass surface. The samples were then etched either vertically or horizontally with an acid solution having a specific concentration (e.g., 5.5 M HF/6.5M $H_2SO_4$) for a specific time (e.g., 30 seconds); the etched sample was then removed and then rinsed; and Haze, sparkle, and DOI of the etched samples were measured.

Preparation of Particulated Surfaces

<

Example 1

Preparation of Particle Suspensions

Particle suspension masks were prepared by dispersing the particles as described above. Table 2 lists a representative polystyrene polymer particle suspension formulation.

TABLE 2

| Components | Wt. % |
|---|---|
| 2 propyl methylcellulose (J)[1] | 3.27 |
| Ethanol | 78.53 |
| Butanol | 13.2 |
| Polystyrene XOI 3 microns[2] | 5 |
| Total | 100 |

[1]2-propyl methylcellulose (J) - average molecular weight 140,000, from Ashland Chemicals.
[2]Polystyrene XOI are 3 micron polystyrene beads from Sekisui, Japan.

Example 2

Slot Coating of Particle Suspensions

Different methods for applying the particles can be selected. For example, the particle formulation can be spray coated, curtain-coated, screen printed, dip coated, spin coated, applied with a roller onto the glass surface, and like other known methods, or combinations thereof. A slot die is particularly advantaged in embodiments of the disclosure. One advantage of the slot die coating technique is that the coating thickness can be controlled precisely. This is directly related to how much coverage one wishes to achieve on the glass surface. After coating, a very thin layer of particles remained on the surface, such as a monolayer or less than a complete monolayer. This very thin layer of particles improves the ability of the acid to infiltrate the spaces in the coating mask, resulting in, for example, more efficient etching, less acid consumption, and less particle consumption. In embodiments, the interaction between the particles and the glass surface can be further improved by adjusting, for example, the glass or particle chemistry, the particle concentration, the surface charge, and like aspects, or combination thereof. Examples of coating conditions using the spray and slot technologies are listed in Tables 3 and 4.

Etching Particulated Surfaces

Example 3

Immersion Etch of Particulated Surfaces

Glass sheets having particulated glass surfaces prepared by spray or slot coating conditions were etched using various acid formulations with controlled variation in etch time and temperature according to Example 1 were etched using various acid formulations with controlled variation in etch time and temperature, for example, an etch time of 0.5 minute, acids concentration of 6 M HF and 7 M $H_2SO_4$, at ambient (25° C.) temperature, and like conditions. Table 3 provides an exemplary set of the spray conditions.

TABLE 3

Particle formulation spray coat conditions

| Spray Condition | Setting |
| --- | --- |
| Nozzle opening diameter (mm) | 0.76 |
| Flute (degree) | 10 |
| Air assist (psi) | 85 |
| Fluid pressure (psi) | 15 |
| Dispense height (inches) | 3 |
| Speed (inches/sec) | 10 |
| Stroke (mils) | 5 |
| Pass width (in) | 0.10 |
| Number of Passes | 1 |

Table 4 provides an exemplary set of the slot coating conditions for a 3 micron polystyrene (only) particle suspension.

TABLE 4

Particle formulation slot coating conditions.

| Sample | Wet (microns) | Coater Speed (mm/sec) | mL/min | [1]Coating Gap (microns) | Horiz Del[2] | Vert Del[3] | Liq Trig[4] |
| --- | --- | --- | --- | --- | --- | --- | --- |
| 1 | 25 | | 1.12 | 50 | | | |
| 2 | 35 | | 1.57 | 50 | | | |
| 3 | 45 | | 2.02 | 50 | | | |
| 4 | 55 | | 2.46 | 80 | | | |
| 5 | 65 | | 2.91 | 80 | 0.5 | 0.5 | 0.5 |
| 6 | 75 | 5 | 3.36 | 100 | | | |
| 7 | 85 | | 3.81 | 100 | | | |
| 8 | 95 | | 4.25 | 120 | | | |
| 9 | 105 | | 4.70 | 120 | | | |
| 10 | 115 | | 5.15 | 150 | | | |

[1]Height of slot die head from substrate surface in microns prior to depositing particles.
[2]Horiz Del is the horizontal delay, which is a programmable period of time for the machine to delay moving the platen (coating) while the pump is dispensing fluid out the lips. This delay allows sufficient time for the distance between the die and the substrate (the gap) to be filled with fluid. This is also referred to as "forming the bead".
[3]Vert Del is the Vertical Delay, which is a programmable period of time for the machine to wait before moving from the start gap position to the coating gap position. In all instances where an AG surface is being prepared, it can be coated having the start gap being equal to the coating gap, and the horizontal delay setting becomes moot.
[4]Liq Trig is the Liquid Trigger Stop, which is a programmable period of time, towards the end of a coating, where one can turn off the suspension formulation pump prior to reaching the end of the substrate. The platen continues to move, as it was pre programmed, to the stop position (generally the end of the substrate), while the pump pressure subsides. This can be useful for achieving cleaner stops where higher viscosity fluids are being coated.

Table 5 provides examples of various percent coverages for 3 micron particles. The same acid and concentrations of 6M HF/7M $H_2SO_4$ were used.

TABLE 5

| Wet coating thickness, micron(s) | % Coverage | Etch Time (secs for each sample) | Haze | DOI | PPD-0 | PPD-90 |
| --- | --- | --- | --- | --- | --- | --- |
| 25 | 57 | | 2.7 | 86.4 | 5.64 | 5.61 |
| 45 | 83 | | 11.4 | 26 | 6.41 | 6.53 |
| 55 | 86 | | 15.9 | 25.7 | 6.59 | 6.58 |
| 65 | 92 | 30 | 18.3 | 26.4 | 8.38 | 7.98 |
| 75 | 95 | | 20.6 | 26.5 | 9.99 | 9.69 |
| 85 | 95 | | 19 | 27 | 10.62 | 10.44 |
| 95 | 95 | | 18.2 | 27 | 10.91 | 10.46 |
| 105 | 96 | | 15.6 | 27.9 | 11.8 | 11.5 |

Table 6 provides examples of various percent coverages for 5 micron PMMA polymer particles. The same acid concentrations, 6M HF/7M $H_2SO_4$, were used.

TABLE 6

| Wet coating thickness, micron(s) | % Area Coverage of total Coated Area | Etching Time (secs.) | Haze | DOI | PPD-0 | PPD-90 |
| --- | --- | --- | --- | --- | --- | --- |
| 15 | 63.1 | 30 | 4.5 | 65 | 5.9 | 5.8 |
| 20 | 76.1 | 30 | 7 | 42 | 6 | 5.9 |
| 25 | 91 | 30 | 13 | 27 | 6 | 6 |
| 30 | 90.5 | 30 | 16 | 26 | 6.3 | 6.1 |
| 35 | 92.2 | 30 | 16 | 26 | 7.9 | 8.0 |
| 40 | 97.9 | 30 | 14 | 27 | 11 | 11.1 |
| 45 | 97.8 | 30 | 13 | 27 | 12.8 | 11.1 |
| 50 | 98.2 | 30 | 12 | 28 | 15.3 | 14.3 |

In general, as the coverage increased, more particles deposited on the glass surface and became multi-layer, having fewer or smaller openings between particles and the particles were adhered strongly to the glass surface. The higher the particle coverage, the more the particles clump together and have a negative impact on the optical properties. This is clearly demonstrated when the haze level increased and the DOI got lower as seen in Tables 3 and 4. The sparkle (or PPD) increased as the coverage increased as well.

The data in Tables 5 and 6 also demonstrate a wide range of haze that we can achieve by controlling the percent coverage.

The particles used were based on polymer beads (e.g., PMMA and Polystyrene). A wide variety of other particles can be selected. For low molecular weight materials, the annealing temperatures were chosen to be roughly proportional to the Tg of the particles. Examples of other particle materials include, for example, polyesters, polyolefins, polyvinylchloride, polyvinyl acetate, polyvinyl alcohol, polyacrylonitrile, silicone, polyethylene, melamine, (meth)acrylate, polyethylene terephthalate, and like polymers, and mixtures thereof. The particles can be homopolymers, copolymers, terpolymers, and like polymers, and mixtures thereof. The beads may be modified with a surface treatment. They may be either crosslinked or un-crosslinked, and any spherical or flattened fine particles comprised of a plastic can be selected. Waxes are polymers that are considered particularly useful in the disclosure. Classes of waxes can be, for example, plant, mineral, or animal based, and petroleum derived and synthetic waxes. Some example materials are erucamide, stearamide, oleamide, Montan, oxidized polyethylene, copolymers containing these combinations, and a core of one polymer and shell of a different polymer, and others known in the art. These other particles can be selected based on cost, ease of removal, or robustness in acid solutions, and like practical reasons, or combinations thereof.

The mask particle size is not particularly limited. For anti-glare surfaces in display applications, a generally desirable particle size range is from about 1 micron to about 50 microns. Below this range, sub-wavelength effects can reduce the anti-glare scattering, and above this range, unacceptable 'display sparkle' can become visible in some pixelated displays. However, the general technique outlined here is still applicable using particle sizes outside this range—in particular, the slot die coating method for creating several layers of particles, the ability to tune glass roughness through annealing of a particle mask before etching, or combinations thereof. Particles larger than 50 microns may be useful in non-display applications, such as in mouse pads or other touch input devices, anti-glare surface for non-pixelated displays, and like articles or devices. Particles less than 1 micron may be useful for generating nano-structured surfaces, for example gradient-index anti-reflection coatings or hydrophobic/oleophobic structured surfaces. Other non-display applications that could benefit from this method for creating light-scattering surfaces on glass include photovoltaic panels for improved light trapping/absorption, and aesthetic panels or covers for appliances or architectural applications.

Post Etch Processing

Example 4

Optional Flaw Reduction

If desired the etched surface can optionally be further processed to remove surface flaws or defects from the surface and to further enhance the strength, toughness or scratch resistance, and appearance properties of the surface (see for example, commonly owned and assigned U.S. Provisional Patent Application 61/293,032, filed Jan. 7, 2010, entitled "Impact-Damage-Resistant Glass Sheet"). Thus, a glass sheet including at least one acid-etched surface as disclosed herein, alone or in combination with a tempering surface compression layer, is subjected to a combination of a surface tempering treatment and then an additional acidic etch treatment. The resulting glass sheet exhibits high strength (ball drop) and is a useful component in damage-resistant consumer display devices.

Example 5

Polymer Particle Formulations

Table 7 provides a summary of several exemplary polymer particle formulations.

TABLE 7

| | Coating formulation | | |
|---|---|---|---|
| Ingredients | Mixture of polymer and wax particles[2] wt. % | Polystyrene particles[3] wt. % | PMMA particles[4] wt. % |
| Medium 80 683 Solvent Blend[1] | 20.66 | — | — |
| 2 propyl methylcellulose (J) | 0.92 | 3.24 | 3.27 |
| Ethanol | 54.61 | 78.37 | 77.47 |

TABLE 7-continued

| | Coating formulation | | |
|---|---|---|---|
| Ingredients | Mixture of polymer and wax particles[2] wt. % | Polystyrene particles[3] wt. % | PMMA particles[4] wt. % |
| Isopropanol | 7.5 | — | — |
| Butanol | — | 13.20 | 14.26 |
| Sekisui PMMA—8 microns | 13.81 | — | — |
| Polystyrene—3 microns | — | 5.19 | — |
| Wax—Durex 8015—6 microns | 2.5 | — | — |
| Sekisui PMMA—5 microns | — | — | 5 |
| Total | 100 | 100 | 100 |

[1]Medium 80 683 (a binder from Ferro Corp.; 8% cellulose derivative in mixed solvent of denatured ethanol, ca. 40 wt %, and diethylene glycol monomethylether, ca. 60 wt %).
[2]A mixture of PPMA particles (8 microns diameter) and wax particles (6 microns).
[3]Polystyrene particles (3 microns).
[4]PMMA particles (5 microns).

Exemplary particle compositions used for particle suspension and deposition were, for example, a copolymer of methyl methacrylate and ethylene glycol dimethacrylate. Other polymer particle sizes, particle compositions, mixing two or more particle sizes with same or different compositions together, or glass substrates may involve additional or further formulation manipulation to produce finished substrates having the desired roughness, haze level, and DOI properties in the finished article.

Example 6

Particle Mask Formulations

FIGS. 13A to 13D show micrographs of Gorilla® glass coated with un-polished dispersion. The wet coated layer thicknesses were approximately 35 microns, 40 microns, 45 microns, and 50 microns, respectively. It can be seen that the wet coated layer on the surface is neither a mono-layer, nor less than a mono-layer. The beads are piled up and distributed un-evenly on the surface. In the macro-view, one can easily see the density bands on the coated samples, which directly relates to the surface defect discovered on the AG surface after etching.

FIGS. 14A to 14D show micrographs of Gorilla® glass coated with a polished dispersion. The wet coated layer thicknesses were approximately 35 microns, 40 microns, 45 microns, and 50 microns, respectively.

In contrast to the un-polished dispersion shown in FIG. 13, the polished dispersion shown in FIG. 14, resulted in a configuration having slightly less than mono-layer particle coverage. Polishing the dispersion results in the dispersion being homogenous and can flow from the slot die cavity uniformly disperse and at a uniform rate. The coated polished and unpolished dispersion samples look very different considering that both dispersions were coated having the identical coating parameters with the exception of the disclosed in-line polishing treatment. Table 8 lists a representative particle formulation used in embodiments of the disclosure.

TABLE 8

Particle formulation.

| Components | Wt. % |
|---|---|
| 2 propyl methylcellulose (J)[1] | 3.1 |
| Ethanol | 74.61 |
| Butanol | 12.54 |
| Water | 4.43 |
| Polystyrene XOI 3 microns[2] | 4.75 |
| DODEC | 0.57 |
| Total | 100 |

[1]&[2]See Table 2 footnotes above.

Table 9 shows examples of the slot conditions selected for obtaining different wet thicknesses.

TABLE 9

Example slot coating conditions selected for different wet thicknesses.

| Sample material | Wet Thickness (microns) | mm/sec | mL/min | S-gap (microns) | C-gap (microns) | Horiz Del | Vert Del | Lig Trig |
|---|---|---|---|---|---|---|---|---|
| 52 | 35 | 10 | 3.13 | 60 | 60 | 0.5 | 0.5 | 5 |
|  | 40 |  | 3.58 | 90 | 90 |  |  |  |
|  | 45 |  | 4.03 |  |  |  |  |  |
|  | 50 |  | 4.48 |  |  |  |  |  |

The "polished" particle dispersions were prepared as mentioned above and polished as follows. When the dispersion formulations were ready to coat, 1.5 mm high density zirconium oxide beads, known as Zirmil-Y, available from Glen Mills Inc., New Jersey, are added into the formulation (e.g., in a 1:1 ratio), and rolled for 30 minutes on a roller at 60 rpm or similarly processed using the in-line polisher as illustrated in FIG. 12. The larger oxide milling beads were then filtered out or retained by the in-line mill. The resulting dispersion was homogenous and ready to be coated with the slot die coater. The coated samples were etched vertically in an acid solution at a specific concentration, for example, 5.5M $HF$/6.5M $H_2SO_4$, for a specific time, for example, 30 seconds. The etched sample was then removed from the bath for rinsing and removal of the backside protection film. The etched sample was then measured for Haze, sparkle, and DOI properties.

Different methods for applying the particles can be contemplated. For example, a formulation could be sprayed, curtain-coated, screen printed, dip coated, spin coated, applied with a roller, and like methods, or combinations thereof, onto the glass surface. Slot die was a particularly useful coating method in this disclosure. One particular advantage of the slot die coating approach is that the coating thickness can be controlled very precisely. This control is useful in obtaining desired particle surface coverage on the glass surface. After coating, a very thin layer of particles remained on the surface. The interaction between the particles and the glass surface can be further improved, for example, by adjusting the glass or particle chemistry, particle concentration, the surface charge, and like aspects, or combinations thereof. In embodiments, a wet coating method can be further improved by, for example, applying only from about 1 to 2 layers of particles. In embodiments, the wet coating method can be further improved by, for example, applying less than a monolayer. Table 10 below shows the optical data for samples with and without polished that DOI values increase and sparkle values decrease for the dispersions at the same thickness. The results make evident polished dispersion samples compared to the "unpolished" dispersion control samples.

TABLE 10

Optical data for samples with and without polished dispersions having the same layer thickness.

| Wet Thickness (microns) | Haze (9 meas) | DOI (3 meas) | Sparkle (6 meas) |
|---|---|---|---|
| Un-polished Dispersion | | | |
| 35 | 4 | 46 | 7.3 |
|  | 4 | 51 | 7.3 |
|  | 4 | 55 | 7.0 |
|  | 4 | 46 | 7.3 |
| 30 minute Polished Dispersion | | | |
| 35 | 4 | 70 | 6.6 |
|  | 4 | 74 | 7.0 |

TABLE 10-continued

Optical data for samples with and without polished dispersions having the same layer thickness.

| Wet Thickness (microns) | Haze (9 meas) | DOI (3 meas) | Sparkle (6 meas) |
|---|---|---|---|
|  | 4 | 75 | 6.2 |
|  | 4 | 74 | 6.2 |
|  | 4 | 72 | 6.2 |
|  | 4 | 73 | 6.3 |
|  | 4 | 75 | 6.3 |
|  | 4 | 70 | 6.5 |

The wet thickness is the same for both instances but the optical values for the dispersion without polishing shows unacceptable sparkle. Sparkle is the most important attribute for AG properties and sparkle is preferably less than 7. When sparkle is greater than 7, users or observers will usually report "non-uniformity" in the display due to AG features that are not small enough.

Figure 15:
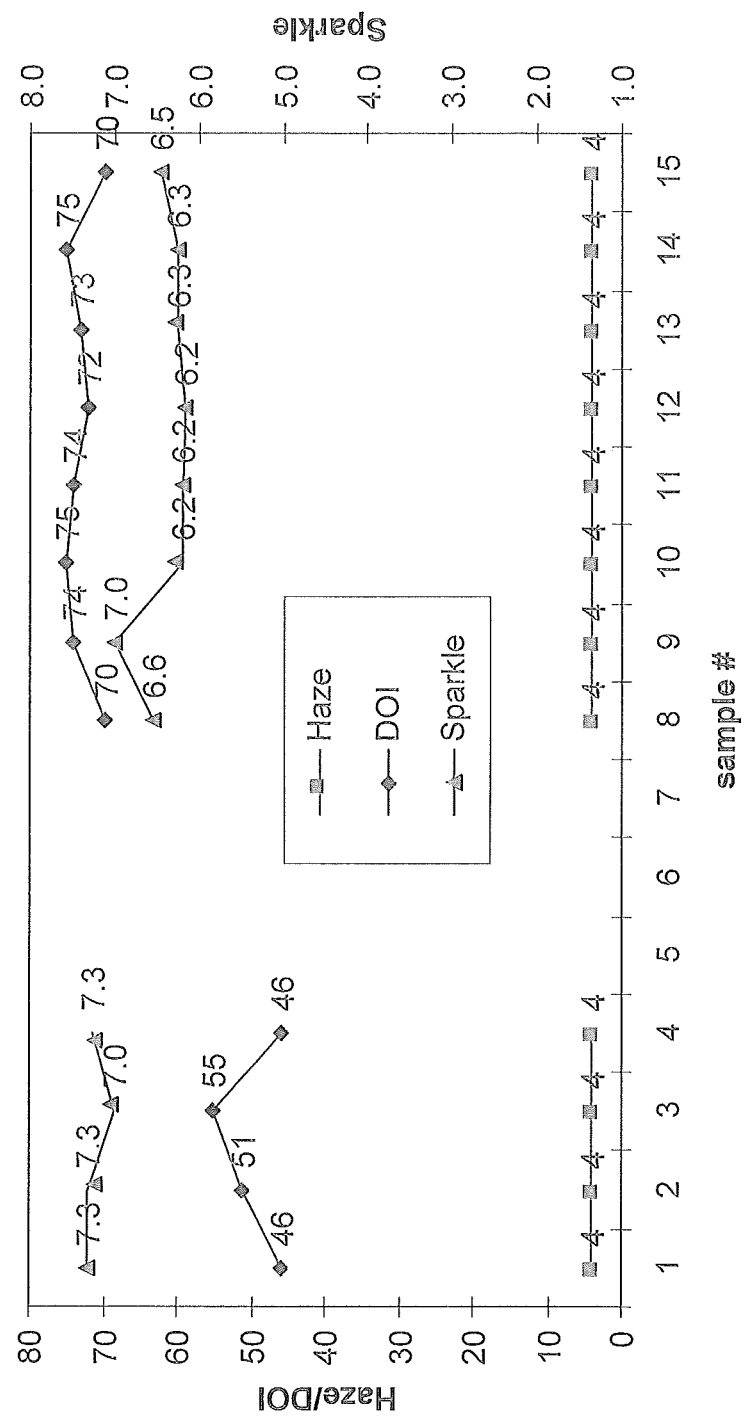
FIG. 15 shows a graph of optical data for un-polished dispersion coatings (left side) and for dispersions coatings (right side) that were polished for 30 minutes prior to slot coating.

FIG. 15 shows a graph of the data listed in Table 10. Optical data for samples 1 to 4 (left side) are from un-polished dispersion coatings. Data for samples 8 to 15 (right side) were for polishing the dispersion for 30 minutes prior to slot coating. The formulation is preferably homogenized by polishing in a bead mill or in-line bead mill prior to coating.

The polishing step can be an excellent method to obtain superior uniform particle coating quality and good optical properties of the resulting etched surfaces. We have demonstrated that this is also a preferred method for scale-up to coat larger sized substrates. The disclosed coating method including a particle polishing step is particularly advantaged by, for example, avoiding density bands and poor coating quality in the resulting coated substrate.

Example 7

Particle Mask Formulations Including an Anionic Surfactant

Table 11 shows examples of optical properties of parts coated with a particle mask formulation without a surfactant.

TABLE 11

Optical property results for etching of surfactant-free mask formulations.

| Wet Thickness (microns) | Haze % | DOI | P-0 | P-90 |
|---|---|---|---|---|
| 35 | 5 | 43 | 7.4 | 7.2 |
|  | 5 | 46 | 7.5 | 7.3 |
|  | 5 | 47 | 7.5 | 7.3 |
| 40 | 8 | 27 | 6.9 | 6.9 |
|  | 7 | 29 | 7.1 | 7.0 |
|  | 7 | 31 | 7.5 | 7.6 |
| 45 | 10 | 26 | 6.6 | 6.4 |
|  | 10 | 27 | 6.8 | 6.8 |
|  | 9 | 27 | 7.0 | 6.9 |
| 50 | 13 | 26 | 6.4 | 6.4 |
|  | 11 | 26 | 6.6 | 6.6 |
|  | 12 | 26 | 6.7 | 6.4 |
| 55 | 13 | 26 | 7.2 | 7.1 |
|  | 12 | 26 | 7.2 | 7.0 |
|  | 15 | 26 | 6.8 | 6.6 |

Columns P-0 and P-90 are the sparkle measurements on AG sample in the 0 and 90 degree orientation. The sparkle is preferably less than 7 than selected applications. At 35 microns wet thickness, haze is about 5% but the sparkle is unacceptable. Only a wet thickness of 45 microns and 50 microns show the sparkle less than 7. However, the haze is very high and will decrease the device contrast. One goal is to have haze less than 5% while still have PPD less than 5. A particle mask formulation without a surfactant cannot achieve this targeted specification. Table 12 shows examples of parts coated using a formulation having added surfactant (0.6 wt % DODEC).

TABLE 12

Impact of added surfactant in the particle mask coating formulation on optical properties resulting after 30 second acid etching with 6M HF/7M $H_2SO_4$.

| Wet thickness (microns) | Haze % | DOI | P-0 | P-90 |
|---|---|---|---|---|
| 35 | 5 | 67 | 5.5 | 5.5 |
|  | 5 | 58 | 5.8 | 5.5 |
|  | 5 | 60 | 5.6 | 5.5 |
|  | 5 | 60 | 5.6 | 5.5 |
| 45 | 7 | 35 | 6.4 | 5.9 |
|  | 6 | 39 | 6.2 | 6.1 |
| 50 | 8 | 35 | 6.7 | 6.7 |
|  | 7 | 36 | 6.6 | 6.6 |
|  | 7 | 41 | 6.9 | 6.7 |
|  | 6 | 40 | 7.2 | 7.3 |
|  | 7 | 38 | 6.9 | 6.7 |
|  | 8 | 34 | 6.8 | 6.5 |
|  | 8 | 38 | 6.8 | 6.7 |
|  | 7 | 36 | 7.0 | 6.8 |

Several points are notable in the Table 12. First, at 35 microns wet thickness and the same acid concentration and the same etching time, it was possible to make samples having sparkle less than 7 when using a formulation having added surfactant (vs. data in Table 11). Also, the sparkle is about 1 point reduced for 35 microns (vs. Table 11). Additionally, the haze at 50 microns thickness was reduced from 13% for a formulation free of surfactant to about 7% when a surfactant was added (vs. Table 11). Table 13 shows examples of parts coated using a formulation having added surfactant (0.6 wt % DODEC).

TABLE 13

Optical results for acid (5.5M HF/6.5M $H_2SO_4$) etching of parts coated at a wet thickness of 35 microns with a mask formulation having added surfactant.

| Etching time (seconds) | Haze % | DOI | P-0 | P-90 |
|---|---|---|---|---|
| 20 | 3 | 69 | 6.2 | 6.2 |
|  | 3 | 71 | 6.1 | 6.1 |
|  | 3 | 67 | 6.1 | 6.2 |
|  | 3 | 69 | 6.4 | 6.3 |
|  | 3 | 69 | 6.2 | 6.2 |
|  | 3 | 71 | 6.2 | 6.1 |
|  | 3 | 68 | 6.4 | 6.1 |
|  | 3 | 70 | 6.5 | 6.4 |
|  | 3 | 66 | 6.4 | 6.2 |
|  | 3 | 69 | 6.4 | 6.2 |
|  | 3 | 68 | 6.3 | 6.3 |
|  | 3 | 71 | 6.4 | 6.4 |
|  | 3 | 65 | 6.5 | 6.4 |
|  | 3 | 64 | 6.7 | 6.5 |
|  | 3 | 64 | 6.5 | 6.2 |
|  | 3 | 68 | 6.5 | 6.4 |
|  | 3 | 71 | 6.5 | 6.2 |
|  | 3 | 70 | 6.4 | 6.5 |
|  | 3 | 67 | 6.6 | 6.4 |
|  | 3 | 67 | 6.7 | 6.6 |
|  | 3 | 66 | 6.6 | 6.4 |

The 35 microns wet thickness results in Table 13 are similar to 35 microns wet thickness results in Table 12 data except that the acid concentration was lower and the etch time was shorter. Reducing the acid concentration and time allows one to achieve even lower haze and while maintaining sparkle less than 7. Without the added surfactant, the desired optical properties on Gorilla glass could not be achieved. The surfactant apparently helped the particles release from the glass surface at about the same time during the acid etching step in repeated experiments and thus produced very reproducible results.

Although not limited by theory, a specific surfactant (i.e., dodecylbenzenesulfonic acid, sodium salt, DODEC) selected may form a mono-molecular layer surrounding each polymer particle, creating lubrication conducive to achieving the proper spacing of particles after drying. This surfactant layer also acts to release the polymer particle from the glass surface during the etching process. The release timing can be significant in achieving the proper AG optical characteristics. Another material, classically defined as a silyated organic surfactant blend or coating aide, Silwet® Hydrostable 212 surfactant, available from Momentive Performance Materials, Columbus, Ohio.

Figure 16C:
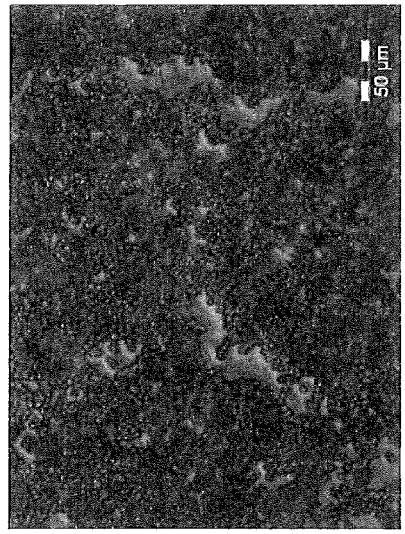
FIGS. 16A to 16C show micrographs of Gorilla® glass coated with particle dispersions that included a surfactant additive.
Figure 16A:
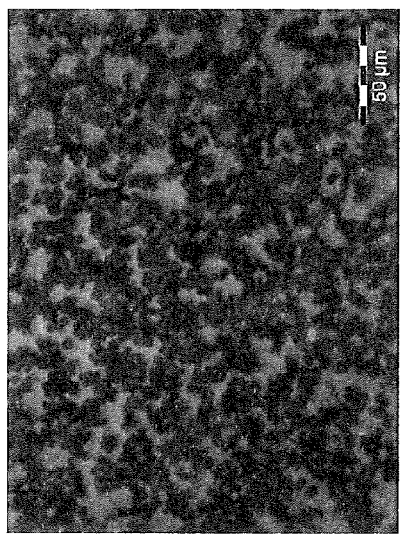
Figure 16B:
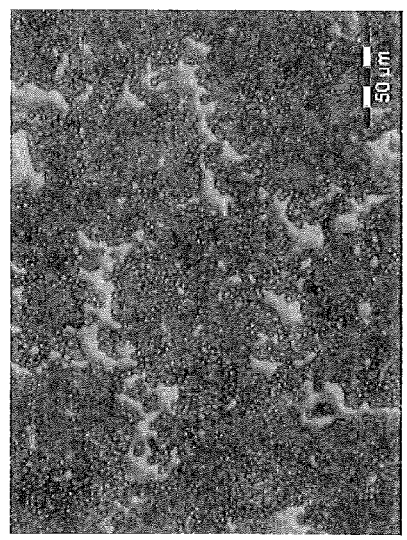

A surfactant is desired so as to have the formulation obtain good AG optical properties. It was found that not all surfactants work the same. Data in tables demonstrates a wide range of haze that can be achieved while still maintaining other optical attributes, and reproduced very well when surfactant is present. additive. FIG. 16A has a coating of 35 micron particles having a wet thickness including a surfactant. FIG. 16B has a coating of 45 micron particles having a wet thickness including a surfactant. FIG. 16C has a coating of 55 micron particles having a wet thickness including a surfactant. Table 14 shows examples of the slot die conditions for two different wet thickness using a 3 micron particle suspension to a glass substrate.

Commonly owned and assigned U.S. Ser. No. 13/090,522 mentions use of surfactant to improve the optical properties, especially to achieve low haze while maintaining the sparkle and DOI in an acceptable range.

FIGS. 16A to 16C show micrographs of Gorilla® glass coated having particle dispersions that include a surfactant

TABLE 14

Unpolished Particle formulation and Polished Particle formulation slot coating conditions.

| Formulation Sample | Wet Thickness (microns) | Coater Speed (mm/sec) | Dispense rate (mL/min) | S-Gap (microns) | C-Gap (microns) | Horiz Del[1] | Vert Del[3] | Liq Trig[4] |
|---|---|---|---|---|---|---|---|---|
| unpolished | 35 | 15 | 4.70 | 70 | 70 | 0.5 | 0.5 | 5 |
| polished | 50 | 10 | 4.48 | 100 | 100 | 0.5 | 0.5 | 5 |

[1,2,3,] and [4]see Table 4 above.

Table 15 lists a particle formulation A having added surfactant and a comparative formulation B free of added surfactant.

TABLE 15

Particle formulation having surfactant ("A") and a comparative formulation ("B") free of surfactant.

| Components | A (Wt. %) | B (Wt. %) |
|---|---|---|
| 2 propyl methylcellulose (J)[1] | 3.1 | 3.27 |
| Ethanol | 74.61 | 78.53 |
| Butanol | 12.54 | 13.2 |
| Water | 4.43 | — |
| Polystyrene XOI 3 microns[2] | 4.75 | 5 |
| DODEC surfactant (Dodecylbenzenesulfonic acid, sodium salt) | 0.57 | — |
| Total | 100 | 100 |

[1]and[2]See Table 2 footnotes above.

The disclosure has been described with reference to various specific embodiments and techniques. However, it should be understood that many variations and modifications are possible while remaining within the scope of the disclosure.

What is claimed is:

1. A method of making an article having an anti-glare surface, comprising:
   continuously polishing a liquid suspension of particles;
   slot coating the continuously polished liquid suspension of particles on at least one surface of the article to provide a particulated mask covering from about 40 to 92% of the coated surface area;
   contacting the at least one surface of the article having the particulated mask and an etchant to form the anti-glare surface, wherein the particulated mask is free of density bands, and the anti-glare surface of the article has low sparkle of from about 1 to about less than or equal to 7 as measured by PPD at 00 and 900, and wherein polishing the suspension of particles is accomplished continuously and just before a slot die in an in-line polisher.

2. The method of claim 1 wherein the at least one surface of the article comprises a glass, the particulated mask comprises a polymer, a wax, or mixture thereof, and the etchant comprises at least one acid.

3. The method of claim 2 wherein the surface glass is independently comprised of at least one of a soda lime silicate glass, an alkaline earth aluminosilicate glass, an alkali aluminosilicate glass, an alkali borosilicate glass, a boroaluminosilicate glass, or a combination thereof, and the etchant comprises at least one acid selected from HF, $H_2SO_4$, $HNO_3$, HCl, $CH_3CO_2H$, $H_3PO_4$, or a combination thereof.

4. The method of claim 1 wherein contacting the surface and an etchant comprises exposing the surface having the particulated mask to the etchant for about 1 second to about 30 minutes.

5. The method of claim 1 wherein the particulated mask has particles having a $D_{50}$ diameter of from about 1 to about 30 micrometers.

6. The method of claim 1 further comprising washing the resulting anti-glare surface, chemically strengthening the anti-glare surface, or a combination thereof.

7. The method of claim 1 further comprising, prior to etching, contacting at least another surface of the article with an optionally removable, etch-resistant protective layer.

8. The method of claim 1 wherein the suspension of particles comprises at least one of: a glass, a ceramic, a metal, a salt, a clay, a polymer, a copolymer, nano-particles, cross-linked polymer particles, UV cured particles, a composite, wax, or a combination thereof.

9. The method of claim 1 wherein the protective particle mask is less than or equal to a monolayer.

10. The method of claim 1 wherein the suspension of particles further includes an anionic surfactant.

11. The method of claim 1 wherein polishing the suspension of particles is accomplished continuously during slot coating.

12. A method of creating an anti-glare glass surface, comprising:
   continuously polishing a liquid suspension of particles;
   contacting a glass surface with the continuously polished liquid suspension of particles from a slot coater to deposit a protective particle mask having surface area coverage of about 60 to 92% of the contacted area;
   contacting the resulting particulated glass surface and an etchant to form the anti-glare surface; and
   wherein polishing the suspension of particles is accomplished continuously and just before a slot die in an in-line polisher.

* * * * *